(12) United States Patent
Tsutsumi et al.

(10) Patent No.: US 7,881,597 B2
(45) Date of Patent: Feb. 1, 2011

(54) IMAGE BLUR CORRECTION DEVICE, LENS BARREL AND IMAGING APPARATUS

(75) Inventors: Takuya Tsutsumi, Tokyo (JP); Yutaka Maeda, Tokyo (JP)

(73) Assignee: Sony Corporation (JP)

(*) Notice: Subject to any disclaimer, the term of this patent is extended or adjusted under 35 U.S.C. 154(b) by 152 days.

(21) Appl. No.: 12/291,253

(22) Filed: Nov. 7, 2008

(65) Prior Publication Data
US 2009/0185796 A1   Jul. 23, 2009

(30) Foreign Application Priority Data
Nov. 19, 2007   (JP) ............................ P2007-299673

(51) Int. Cl.
*G03B 17/00* (2006.01)
*H04N 5/228* (2006.01)
*G02B 27/64* (2006.01)

(52) U.S. Cl. ...................... 396/55; 348/208.11; 359/557

(58) Field of Classification Search .................. 396/55, 396/52; 348/208.99, 208.4, 208.7, 208.11; 359/554, 557
See application file for complete search history.

(56) References Cited

U.S. PATENT DOCUMENTS 6,160,959 A * 12/2000 Mizumoto ................... 396/55
2007/0133092 A1   6/2007 Maeda et al.

FOREIGN PATENT DOCUMENTS

JP   2000-258813 A   9/2000
JP   2007-156352 A   6/2007

* cited by examiner

*Primary Examiner*—Rochelle-Ann J Blackman
(74) *Attorney, Agent, or Firm*—Lerner, David, Littenberg, Krumholz & Mentlik, LLP

(57) ABSTRACT

There is provided an image blur correction device including: a correction lens; a first movable frame; a second movable frame; a fixed frame; a first main guide shaft and a first auxiliary guide shaft; a second main guide shaft and a second auxiliary guide shaft; a first driving part; and a second driving part. The first auxiliary guide shaft is shorter than the first main guide shaft and the second driving part is placed between the first auxiliary guide shaft and the correction lens. The second auxiliary guide shaft is shorter than the second main guide shaft and the first driving part is placed between the second auxiliary guide shaft and the correction lens.

8 Claims, 16 Drawing Sheets

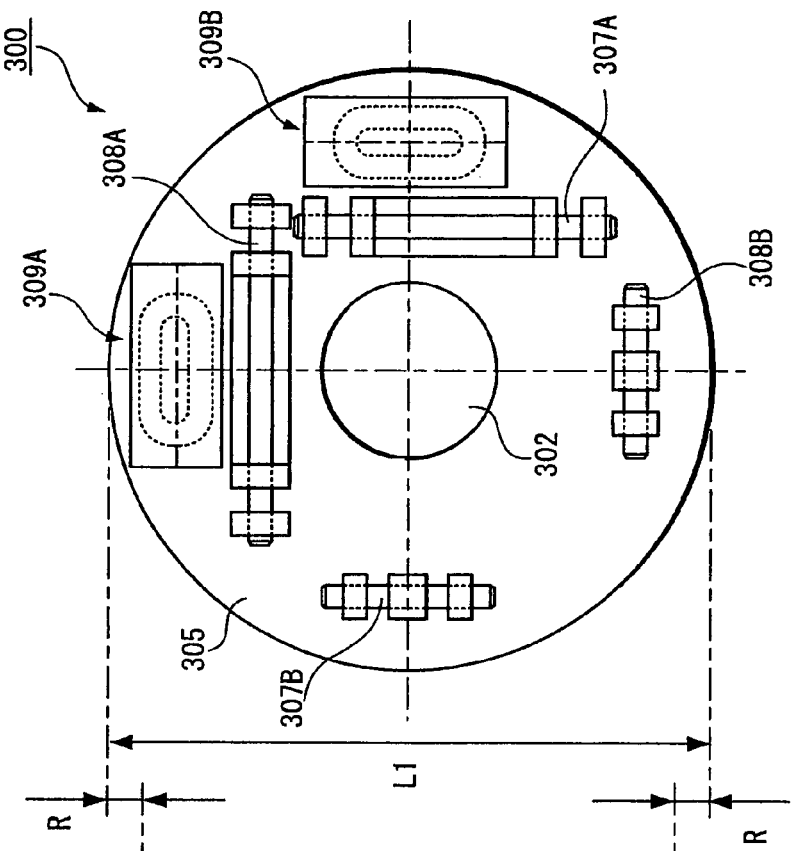
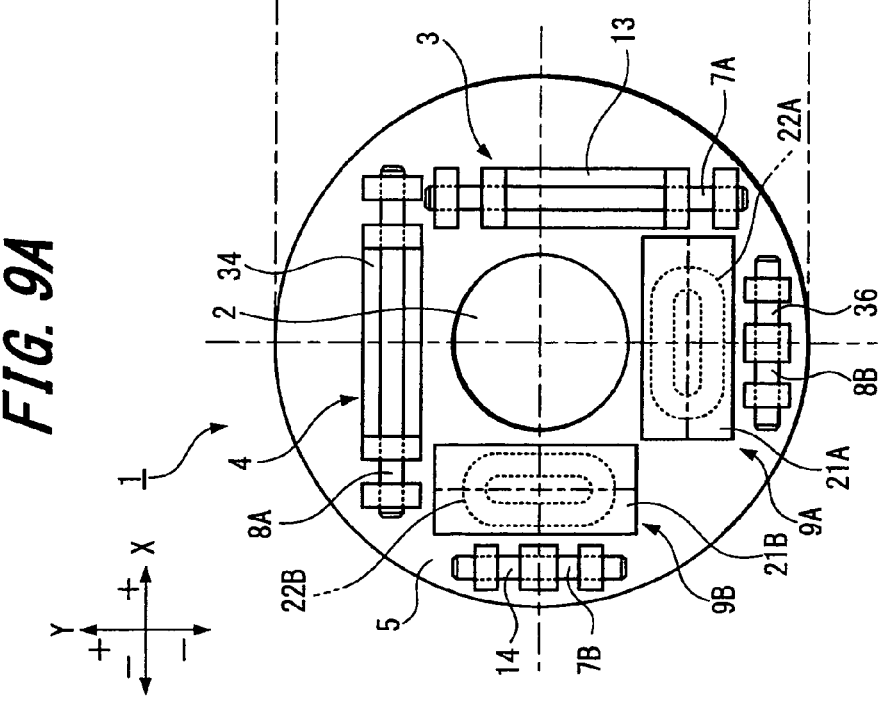

IMAGE BLUR CORRECTION DEVICE, LENS BARREL AND IMAGING APPARATUS

CROSS REFERENCES TO RELATED APPLICATIONS

The present application claims priority from Japanese Patent Application No. JP 2007-299673, filed in the Japanese Patent Office on Nov. 19, 2007, the entire content of which is incorporated herein by reference.

BACKGROUND OF THE INVENTION

1. Field of the Invention

The present invention relates to an image blur correction device correcting an image blur caused by vibration or the like during photographing, a lens barrel having the image blur correction device, and an imaging apparatus such as a digital still camera or video camera having the lens barrel.

2. Description of the Related Art

In recent years, performance of imaging apparatuses such as digital still cameras and video cameras has been remarkably improved, and thus still images and moving images may be easily captured by everyone with high image quality and high performance. Such improvement in performance of imaging apparatuses is largely due to improvement in performance of lenses, solid-state imaging devices (such as CCD image sensors and CMOS image sensors) and image processing circuits.

However, no matter how much the performance of lenses, solid-state imaging devices or the like is improved, a high resolution screen blurs and thus a captured image blurs when hands supporting a camera (imaging apparatus) tremble or shake. Therefore, some relatively expensive cameras have an image blur correction device mounted and correcting an image blur caused by shake or the like during photographing. However, image blur correction may be essentially needed not in high-end models for professional use but rather in popular models used by a majority of the public having only a little photographing experience.

Generally, cameras (imaging apparatuses) are demanded to be reduced in size and weight and are preferable to be light and easily carried. However, image blur correction devices of the related art are relatively large. Therefore, when the image blur correction device of the related art is mounted on a camera main body, the lens barrel and the camera are large as a whole, contrary to a demand for reduction in size and weight. In addition, an image blur correction device of the related art may need a large number of components and is significantly expensive due to an increase in the number of components, disadvantageously.

Japanese Unexamined Patent Application Publication No. 2000-258813 discloses an example of an image blur correction device of the related art. Japanese Unexamined Patent Application Publication No. 2000-258813 discloses an image blur correction device used for an optical device such as a video camera. The image blur correction device disclosed in Japanese Unexamined Patent Application Publication No. 2000-258813 is an image blur correction device correcting an image blur by moving part of a photographing lens into a plane perpendicular to an optical axis. The image blur correction device includes a lens holding frame, a first guide section, a second guide section, a first driving section, a second driving section and a position detection section. The lens holding frame holds a correction lens. The first guide section guides movement of the lens holding frame in a first direction in a plane perpendicular to the optical axis. The second guide section guides movement of the lens holding frame in a second direction perpendicular to the first direction. The first driving section drives the lens holding frame in the first direction. The second driving section drives the lens holding frame in the second direction. The position detection section detects a position of the correction lens. The first guide section and part of the second driving section, or the second guide section and part of the first driving section, are provided in positions overlapping each other in an optical axis direction.

According to the image blur correction device disclosed in Japanese Unexamined Patent Application Publication No. 2000-258813, it is expected that the correction device may be reduced in width and height (see paragraph [0032]), for example.

Japanese Unexamined Patent Application Publication No. 2007-156352 discloses another example of an image blur correction device of the related art. Japanese Unexamined Patent Application Publication No. 2007-156352 discloses a lens device having an image blur correction device correcting an image blur caused by vibration or the like during photographing. The lens device disclosed in Japanese Unexamined Patent Application Publication No. 2007-156352 includes: an image blur correction device; and a lens barrel to which the image blur correction device is attached. The image blur correction device has: a lens holding frame holding a correction lens; a first driving section moving the lens holding frame in a first direction perpendicular to an optical axis direction of the correction lens; and a second driving section moving the lens holding frame in a second direction perpendicular to the optical axis direction and also perpendicular to the first direction. The image blur correction device displaces an optical axis of the correction lens held in the image blur correction device from a center of the lens barrel, and is placed so that the first driving section and the second driving section generate thrust in a direction forming an angle of about 45° with a line connecting the optical axis of the correction lens to the center of the lens barrel.

According to the lens device disclosed in Japanese Unexamined Patent Application Publication No. 2007-156352, it is expected that the image blur correction device is efficiently placed in the lens barrel, making it possible to reduce the diameter of the lens barrel and reduce the lens device and the whole imaging apparatus in size (see paragraph [0015]).

SUMMARY OF THE INVENTION

However, the image blur correction device disclosed in Japanese Unexamined Patent Application Publication No. 2000-258813 has a driving section including a coil, a magnet and a yoke and a guide section (shaft) placed overlapping each other in an optical axis direction of a correction lens. Therefore, the whole image blur correction device is increased in size in a thickness direction (the optical axis direction of the correction lens) and the lens barrel on which the image blur correction device is mounted is increased in size, disadvantageously.

In the image blur correction device mounted on the lens device disclosed in Japanese Unexamined Patent Application Publication No. 2000-258813, a driving section including a coil, a magnet and a yoke is placed outside each of main guide shafts 63 and 77. Therefore, an unnecessary space is formed on a side opposite to each of the driving sections across a correction lens in a plane perpendicular to an optical axis direction of the correction lens, so that the image blur correction device and the lens device are increased in size, disadvantageously.

It is desirable to provide an image blur correction device in which a correction lens may be reduced in size in an optical axis direction and in a direction perpendicular to the optical axis direction, and a lens barrel and an imaging apparatus including the image blur correction device.

According to an embodiment of the present invention, there is provided an image blur correction device including a correction lens, a first movable frame, a second movable frame, a fixed frame, a first main guide shaft and a first auxiliary guide shaft, a second main guide shaft and a second auxiliary guide shaft, a first driving part, and a second driving part. The first movable frame holds the correction lens. The second movable frame supports the first movable frame to be movable in a first direction perpendicular to an optical axis of the lens system. The fixed frame supports the second movable frame to be movable in a second direction perpendicular to the optical axis of the lens system and perpendicular to the first direction. The first main guide shaft and the first auxiliary guide shaft are arranged opposite across the correction lens and guide the first movable frame in the first direction. The second main guide shaft and the second auxiliary guide shaft are arranged opposite across the correction lens and guide the second movable frame in the second direction. The first driving part moves the first movable frame in the first direction. The second driving part moves the second movable frame in the second direction. The first auxiliary guide shaft is shorter than the first main guide shaft and the second driving part is placed between the first auxiliary guide shaft and the correction lens, and the second auxiliary guide shaft is shorter than the second main guide shaft and the first driving part is placed between the second auxiliary guide shaft and the correction lens.

According to an embodiment of the present invention, there is provided a lens barrel having a collapsible cylinder extended during photographing, the lens barrel including: a lens system stored in the cylinder; and an image blur correction device placed in the cylinder and having a correction lens configured to correct an image blur in the lens system. The image blur correction device of the lens barrel includes a first movable frame, a second movable frame, a fixed frame, a first main guide shaft and a first auxiliary guide shaft, a second main guide shaft and a second auxiliary guide shaft, a first driving part, and a second driving part. The first movable frame holds the correction lens. The second movable frame supports the first movable frame to be movable in a first direction perpendicular to an optical axis of the lens system. The fixed frame supports the second movable frame to be movable in a second direction perpendicular to the optical axis of the lens system and perpendicular to the first direction. The first main guide shaft and the first auxiliary guide shaft are arranged opposite across the correction lens and guide the first movable frame in the first direction. The second main guide shaft and the second auxiliary guide shaft are arranged opposite across the correction lens and guide the second movable frame in the second direction. The first driving part moves the first movable frame in the first direction. The second driving part moves the second movable frame in the second direction. The first auxiliary guide shaft is shorter than the first main guide shaft and the second driving part is placed between the first auxiliary guide shaft and the correction lens, and the second auxiliary guide shaft is shorter than the second main guide shaft and the first driving part is placed between the second auxiliary guide shaft and the correction lens.

According to an embodiment of the present invention, there is provided an imaging apparatus including: a lens barrel; and a device main body to which the lens barrel is attached. The lens barrel has a collapsible cylinder in which a lens system is stored and which is extended during photographing, and an image blur correction device placed in the cylinder and having a correction lens configured to correct an image blur in the lens system. The image blur correction device in the imaging apparatus includes a first movable frame, a second movable frame, a fixed frame, a first main guide shaft and a first auxiliary guide shaft, a second main guide shaft and a second auxiliary guide shaft, a first driving part, and a second driving part. The first movable frame holds the correction lens. The second movable frame supports the first movable frame to be movable in a first direction perpendicular to an optical axis of the lens system. The fixed frame supports the second movable frame to be movable in a second direction perpendicular to the optical axis of the lens system and perpendicular to the first direction. The first main guide shaft and the first auxiliary guide shaft are arranged opposite across the correction lens and guide the first movable frame in the first direction. The second main guide shaft and the second auxiliary guide shaft are arranged opposite across the correction lens and guide the second movable frame in the second direction. The first driving part moves the first movable frame in the first direction. The second driving part moves the second movable frame in the second direction. The first auxiliary guide shaft is shorter than the first main guide shaft and the second driving part is placed between the first auxiliary guide shaft and the correction lens, and the second auxiliary guide shaft is shorter than the second main guide shaft and the first driving part is placed between the second auxiliary guide shaft and the correction lens.

In an image blur correction device, a lens barrel and an imaging apparatus according to an embodiment of the present invention, an auxiliary guide shaft and a driving part are efficiently placed in a space opposite to a main guide shaft across a correction lens. Therefore, the device may be reduced in size in an optical axis direction of the correction lens and in a direction perpendicular to the optical axis direction to reduce the whole device in size.

BRIEF DESCRIPTION OF THE DRAWINGS

FIGS. 9A and 9B are views comparing sizes of a first example of an image blur correction device according to an embodiment of the present invention and an image blur correction device of the related art.

FIGS. 16A to 16C are views describing optical zooming by a rotating member and an image blur correction device, in which FIG. 16A is a view describing a state where rear cam pins of the image blur correction device are detached from rear inner peripheral cam grooves of the rotating member, FIG. 16B is a view describing a state where front cam pins and rear cam pins of the image blur correction device are engaged with front inner peripheral cam grooves and rear inner peripheral cam grooves of the rotating member, respectively, and FIG. 16C is a view describing a state where front cam pins of the image blur correction device are detached from front inner peripheral cam grooves of the rotating member.

DESCRIPTION OF THE PREFERRED EMBODIMENTS

An image blur correction device, a lens barrel and an imaging apparatus according to embodiments of the present invention will be described below with reference to the drawings; however, the present invention is not limited to the following embodiments.

Figure 1:
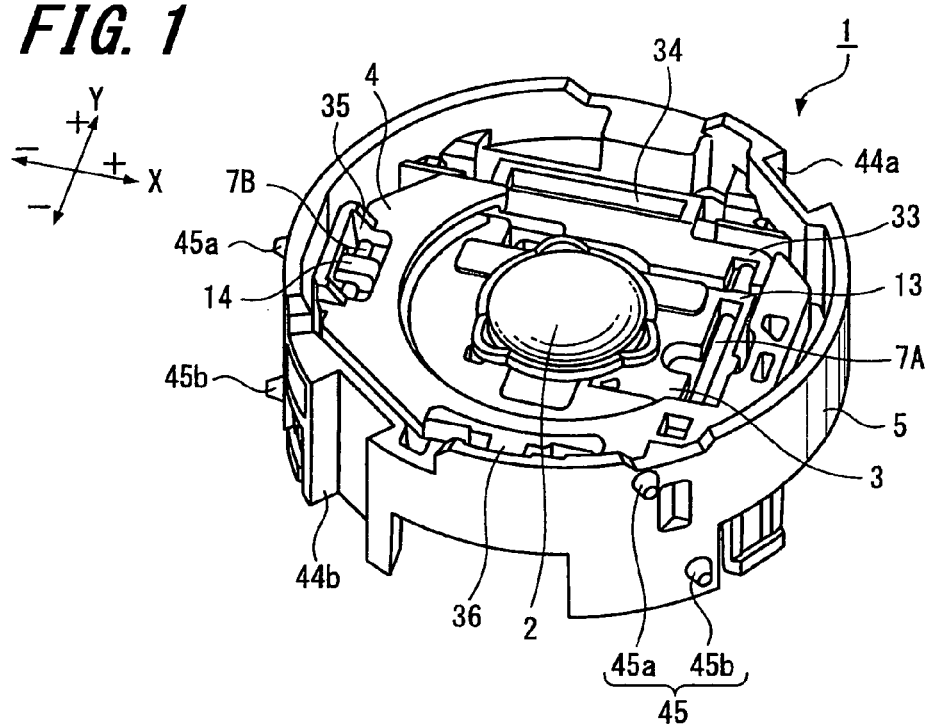
FIG. 1 is a perspective view showing a first example of an image blur correction device according to an embodiment of the present invention.
Figure 2:
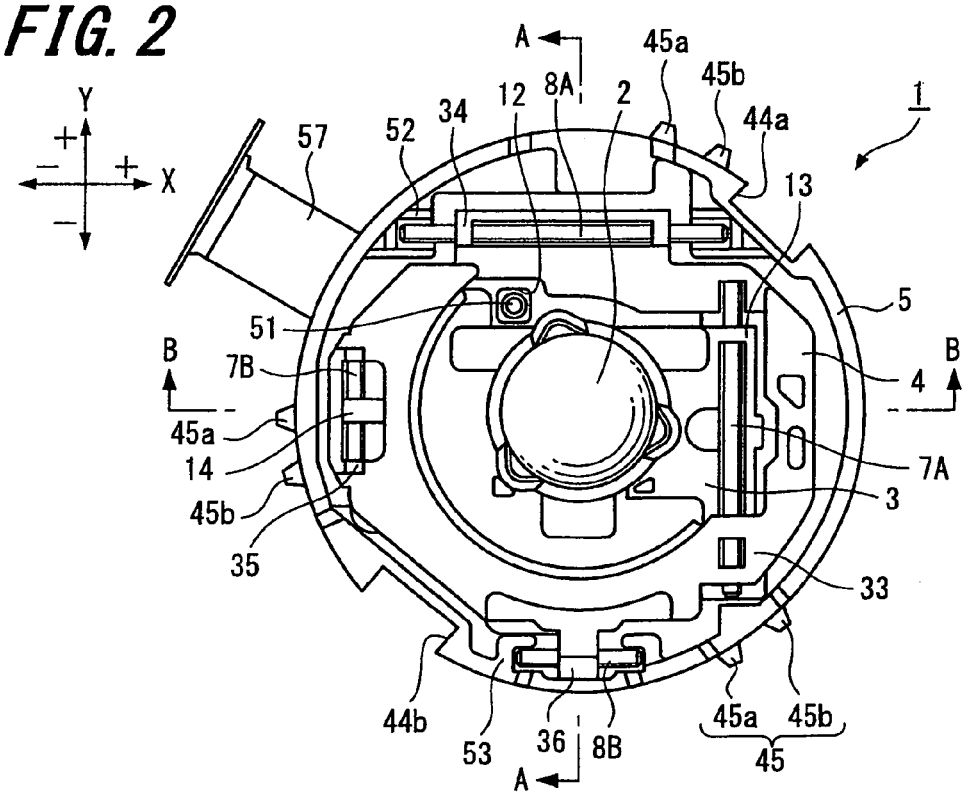
FIG. 2 is a plan view showing a first example of an image blur correction device according to an embodiment of the present invention.
Figure 3:
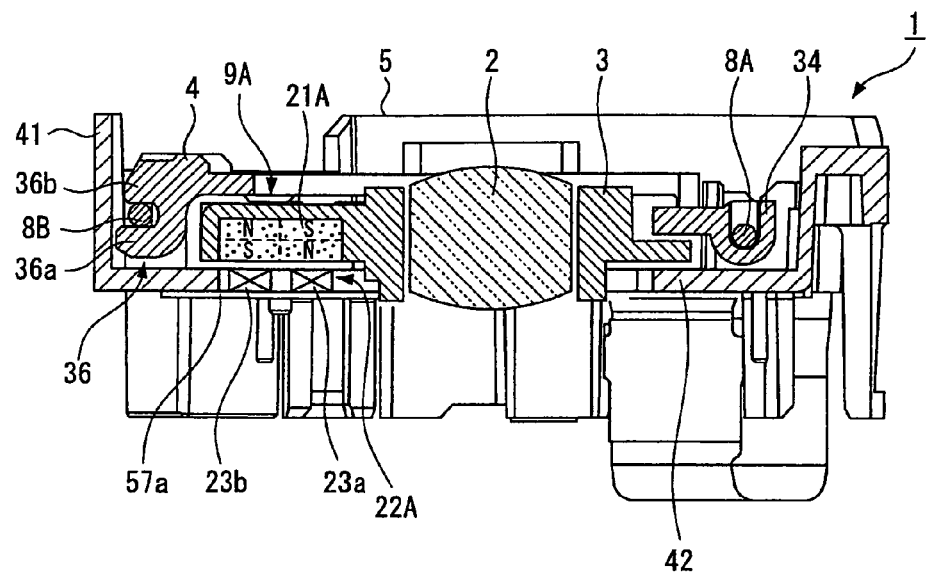
FIG. 3 is an A-A line cross-sectional view of the image blur correction device shown in FIG. 2.
Figure 4:
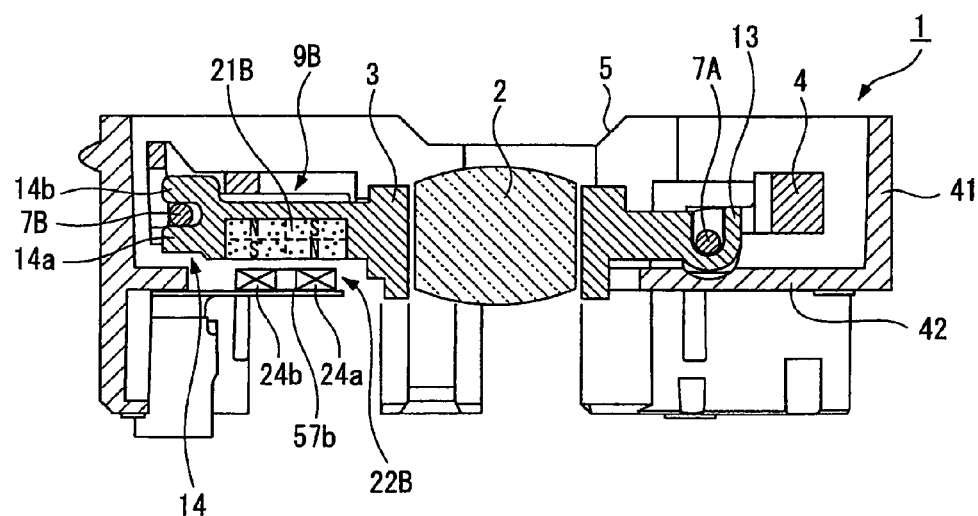
FIG. 4 is a B-B line cross-sectional view of the image blur correction device shown in FIG. 2.
Figure 5:
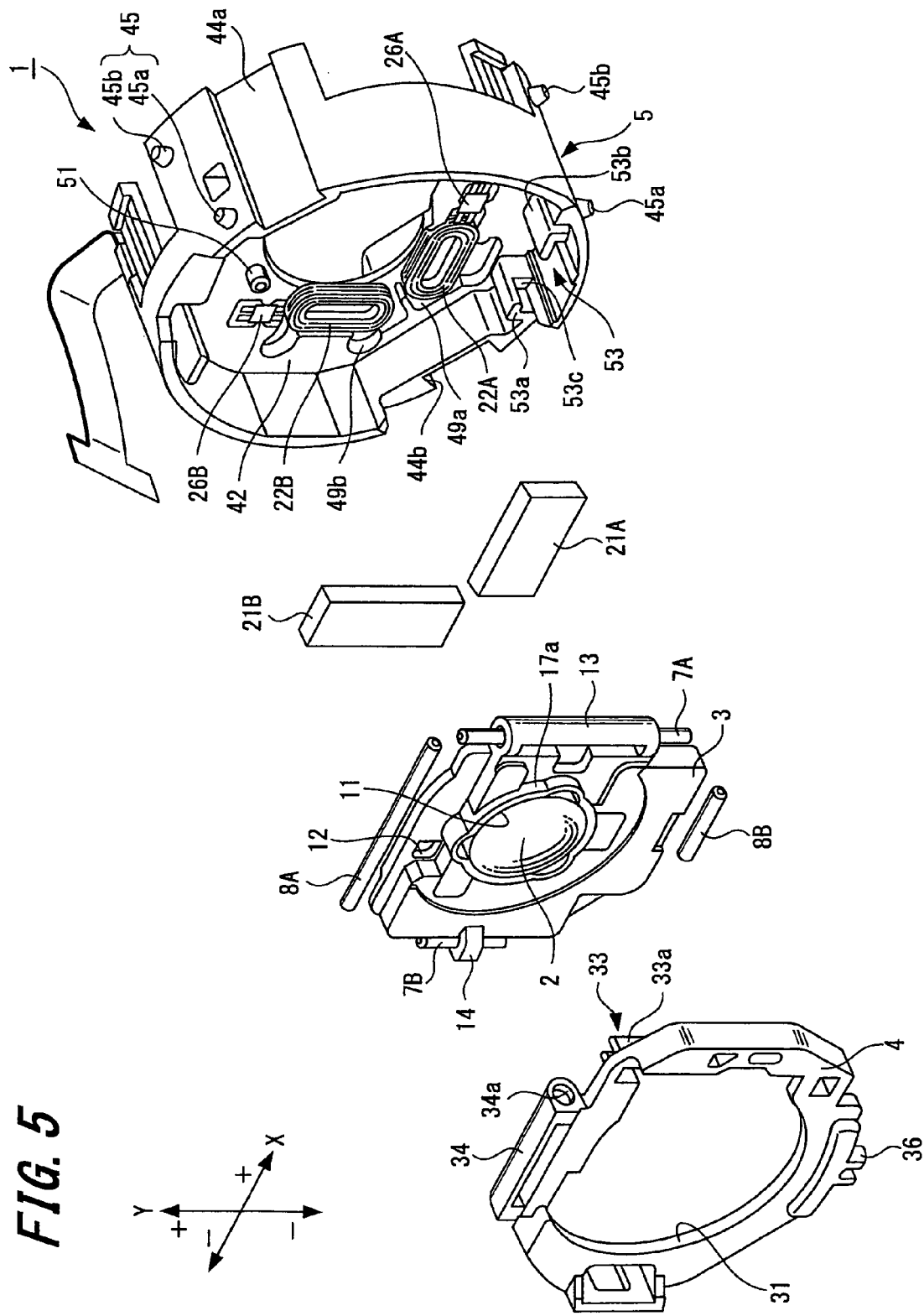
FIG. 5 is an exploded perspective view of a first example of an image blur correction device according to an embodiment of the present invention seen from one side.
Figure 6:
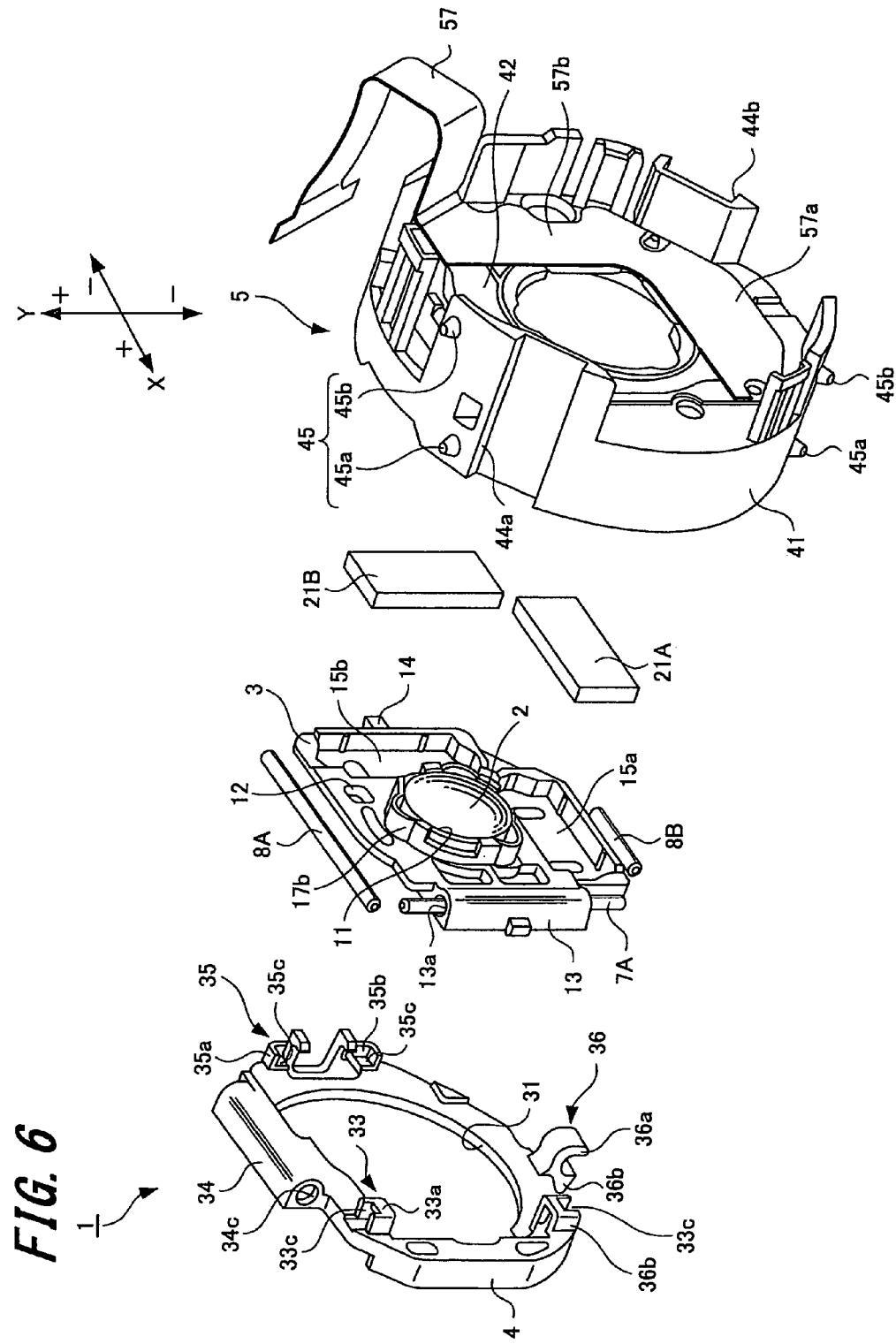
FIG. 6 is an exploded perspective view of a first example of an image blur correction device according to an embodiment of the present invention seen from another side.
Figure 7:
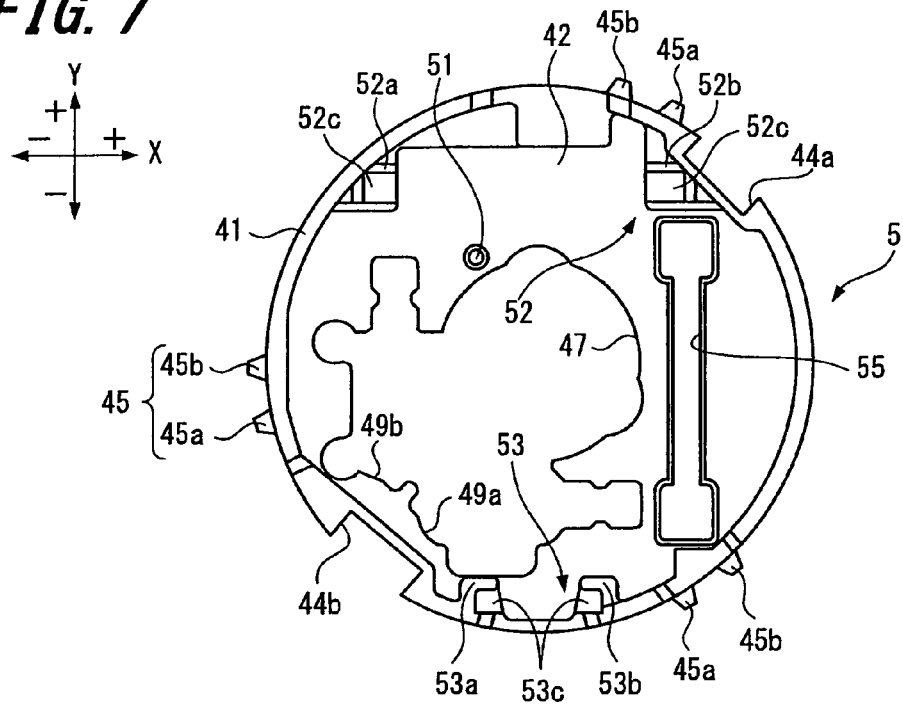
FIG. 7 is a plan view of a fixed frame of a first example of an image blur correction device according to an embodiment of the present invention.
Figure 8:
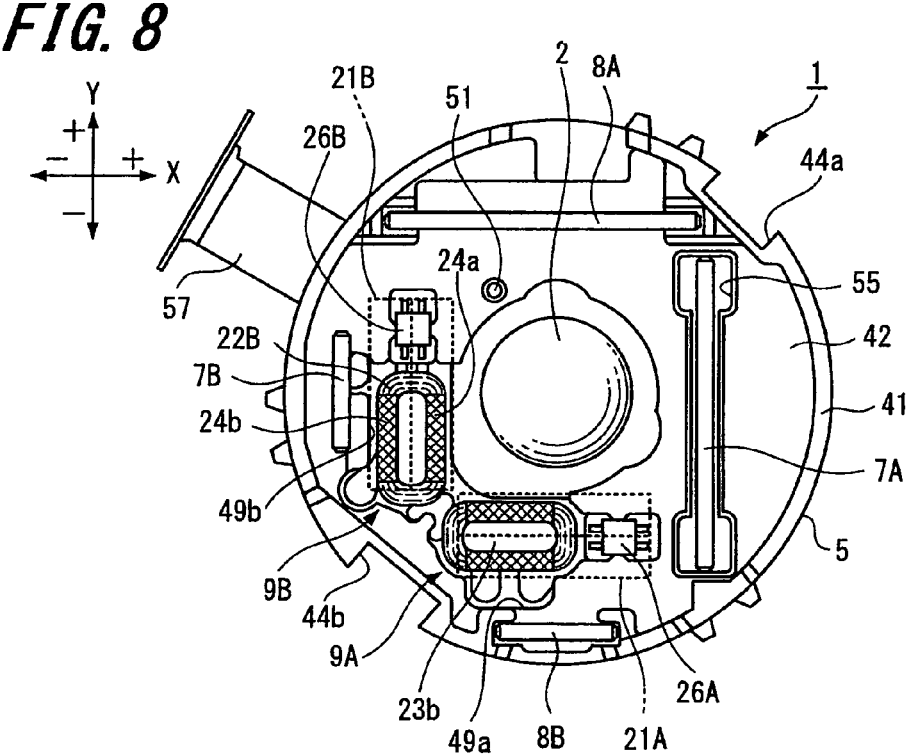
FIG. 8 is a view describing a first driving part and a second driving part of a first example of an image blur correction device according to an embodiment of the present invention.

FIGS. 1 to 8 describe a first example of an image blur correction device according to an embodiment of the present invention. Specifically, FIG. 1 is a perspective view showing a first example of an image blur correction device according to an embodiment of the present invention. FIG. 2 is a plan view of the same. FIG. 3 is an A-A line cross-sectional view of the image blur correction device shown in FIG. 2. FIG. 4 is a B-B line cross-sectional view of the image blur correction device shown in FIG. 2. FIG. 5 is an exploded perspective view of the image blur correction device seen from one side. FIG. 6 is an exploded perspective view of the image blur correction device seen from another side. FIG. 7 is a plan view of a fixed frame. FIG. 8 is a view describing a first driving part and a second driving part. FIGS. 9A and 9B are views comparing sizes of an image blur correction device according to an embodiment of the present invention and an image blur correction device of the related art.

A first example of an image blur correction device according to an embodiment of the present invention shown in FIGS. 1 to 8 is formed as an image blur correction device 1 including a moving magnet-type driving mechanism. The image blur correction device 1 is supported in a later-described collapsible lens barrel 71 to be movable in an optical axis direction of a lens system. Accordingly, a correction lens 2 forming part of the image blur correction device 1 also functions as a lens movable in the optical axis direction of the lens system.

As shown in FIGS. 1 to 4, the image blur correction device 1 includes: the correction lens 2 configured to correct an image blur in the lens system; a first movable frame 3; a second movable frame 4; a fixed frame 5; a first main guide shaft 7A and a first auxiliary guide shaft 7B; a second main guide shaft 8A and a second auxiliary guide shaft 8B; a first electric actuator 9A showing a specific example of a first driving part; and a second electric actuator 9B showing a specific example of a second driving part.

The first movable frame 3 holds the correction lens 2. The second movable frame 4 supports the first movable frame 3 to be movable in a first direction Y perpendicular to an optical axis of the lens system. The fixed frame 5 supports the second movable frame 4 to be movable in a second direction X perpendicular to the optical axis of the lens system and also perpendicular to the first direction Y. The first main guide shaft 7A and the first auxiliary guide shaft 7B guide the first movable frame 3 in the first direction Y. The second main guide shaft 8A and the second auxiliary guide shaft 8B guide the second movable frame 4 in the second direction X. The first electric actuator 9A generates thrust to move the first movable frame 3 in the first direction Y. The second electric actuator 9B generates thrust to move the second movable frame 4 in the second direction X.

The correction lens 2 corrects an image blur by moving a position of a later-described camera main body in the first direction Y and/or the second direction X (usually a composite direction of the first direction Y and the second direction X) in response to an amount of image blur when the camera main body shakes due to trembling or the like in hands.

As shown in FIGS. 5 and 6, the first movable frame 3 holding the correction lens 2 is placed between the fixed frame 5 and the second movable frame 4. The first movable frame 3 is formed of an approximately quadrangular plate and has a fitting hole 11 in which the correction lens 2 is fitted, a limiting receiver hole 12, a first main bearing 13, a first auxiliary shaft engaging part 14 and two magnet recesses 15a and 15b.

The fitting hole 11 is provided in an approximate center of the first movable frame 3. Cylindrical auxiliary projections 17a and 17b surrounding the fitting hole 11 are formed on both surfaces of the first movable frame 3, respectively. Inner surfaces of the auxiliary projections 17a and 17b are formed as an inner periphery of the fitting hole 11, so that the fitting hole 11 has a depth corresponding to a thickness of the correction lens 2. The correction lens 2 fitted in the fitting hole 11 is fixed to the first movable frame 3 by a fixing device such as an adhesive.

The limiting receiver hole 12 is formed as a quadrangular hole. A later-described limiting projection 51 of the fixed frame 5 is inserted into the limiting receiver hole 12. An inner periphery of the limiting receiver hole 12 is brought into contact with the limiting projection 51 to limit movement of the first movable frame 3 in a direction perpendicular to the correction lens 2. The first main bearing 13 and the first auxiliary shaft engaging part 14 are provided on the opposite sides of the first movable frame 3, respectively. The second direction X is a direction connecting the first main bearing 13 to the first auxiliary shaft engaging part 14.

The first main bearing 13 has a bearing hole 13a formed extending along one side of the first movable frame 3. The first direction Y is a direction parallel to an axis of the bearing hole 13a. The first main guide shaft 7A slidably penetrates the bearing hole 13a. As shown in FIG. 4, the first auxiliary shaft engaging part 14 is formed as a laterally protruding approximately U-shaped projection and has a pair of engaging pieces 14a and 14b facing each other in a thickness direction of the first movable frame 3. The first auxiliary shaft engaging part 14 is slidably engaged with the first auxiliary guide shaft 7B.

As shown in FIG. 6, the two magnet recesses 15a and 15b are provided in positions rotationally displaced at about 90° to each other around the fitting hole 11 (correction lens 2). The magnet recess 15a is placed on a (−) side in the first direction Y with respect to the fitting hole 11. The magnet recess 15b is placed on a (−) side in the second direction X with respect to the fitting hole 11.

The magnet recess 15a is rectangular and has two long sides extending in the second direction X. A first magnet 21A forming part of the first electric actuator 9A is fixed to the magnet recess 15a using an adhesive, fixing screws or other fixing methods. The magnet recess 15b is rectangular and as large as the magnet recess 15a and has two long sides extending in the first direction Y. A second magnet 21B forming part of the second electric actuator 9B is fixed to the magnet recess 15b using an adhesive, fixing screws or other fixing methods.

The first magnet 21A and the second magnet 21B are formed to have an identical shape as rectangular flat plates fit into the magnet recesses 15a and 15b, respectively, and are polarized to generate a magnetic force having equal strength in a predetermined direction. That is, each of the first and second magnets 21A and 21B is equally divided in two in a plane direction with different polarities and is also equally divided into two in a thickness direction perpendicular to the plane direction with different polarities.

As shown in FIG. 3, the first magnet 21A of the present embodiment has a north pole polarized on a side close to the correction lens 2 on a surface facing the fixed frame 5 (a surface close to a later-described first coil 22A) and has a south pole polarized on a side away from the correction lens 2 on that surface. The first magnet 21A has a south pole polarized on a side close to the correction lens 2 on a surface facing the second movable frame 4 and has a north pole polarized on a side away from the correction lens 2 on that surface.

As shown in FIG. 4, the second magnet 21B has a north pole polarized on a side close to the correction lens 2 on a surface facing the fixed frame 5 (a surface close to a later-described second coil 22B) and has a south pole polarized on a side away from the correction lens 2 on that surface. The second magnet 21B has a south pole polarized on a side close to the correction lens 2 on a surface facing the second movable frame 4 and has a north pole polarized on a side away from the correction lens 2 on that surface. Arrangement of polarity in the first and second magnets 21A and 21B is not limited to this example. The poles can be arranged with reverse polarities in the plane and thickness directions.

The second movable frame 4 is formed as a ring-shaped hollow member larger than the first movable frame 3 and has a center through-hole 31 facing the fitting hole 11 and the limiting receiver hole 12 of the first movable frame 3. The second movable frame 4 has a second main bearing 33, a third main bearing 34, a first auxiliary bearing 35 and a second auxiliary shaft engaging part 36.

As shown in FIG. 6, the second main bearing 33 is provided on a (+) side in the second direction X with respect to the through-hole 31 on a surface of the second movable frame 4 facing the first movable frame 3. The second main bearing 33 is formed of a pair of bearing pieces 33a and 33b placed at a predetermined interval between them in the first direction Y. A bearing hole 33c is provided in each of the pair of bearing pieces 33a and 33b. The first main guide shaft 7A is inserted into the bearing holes 33c. Accordingly, both edges of the first main guide shaft 7A is press-fit fixed to the pair of bearing pieces 33a and 33b. The first main guide shaft 7A with both edges supported by the second main bearing 33 extends in the first direction Y.

The first auxiliary bearing 35 is provided on a side opposite to the second main bearing 33 across the through-hole 31 on the surface of the second movable frame 4 facing the first movable frame 3. The first auxiliary bearing 35 is formed of a pair of bearing pieces 35a and 35b placed at a predetermined interval between them in the first direction Y. A fitting recess 35c is provided in each of the pair of bearing pieces 35a and 35b. Both edges of the first auxiliary guide shaft 7B are press-fit fixed to the fitting recesses 35c. The first auxiliary guide shaft 7B is shorter than the first main guide shaft 7A and extends in the first direction Y with both edges supported by the first auxiliary bearing 35.

The third main bearing 34 is provided on a (+) side in the second direction X of the second movable frame 4. A bearing hole 34a extending in the second direction X is formed in the third main bearing 34. The second main guide shaft 8A slidably penetrates the bearing hole 34a of the third main bearing 34.

The second auxiliary shaft engaging part 36 is provided on a side opposite to the third main bearing 34 across the through-hole 31 in the second movable frame 4. As shown in FIG. 3, the second auxiliary shaft engaging part 36 is formed as a laterally protruding approximately U-shaped projection and has a pair of engaging pieces 36a and 36b facing each other in a thickness direction of the second movable frame 4. The second auxiliary shaft engaging part 36 is slidably engaged with the second auxiliary guide shaft 8B.

The fixed frame 5 has: a cylinder 41; and a frame 42 extending radially internally in a middle in an axial direction of the cylinder 41. A pair of rectilinear guide grooves 44a and 44b showing a specific example of a pair of guide grooves are provided on an outer periphery of the cylinder 41. The pair of rectilinear guide grooves 44a and 44b are formed in positions rotationally displaced at about 180° to each other around an axis of the cylinder 41 and are formed linearly in the axial direction of the cylinder 41 (a direction parallel to an optical axis of the correction lens 2). Rectilinear guide pieces 113a and 113b provided to a rotation restricting member 111 of the later-described lens barrel 71 (see FIG. 15) are slidably engaged with the pair of rectilinear guide grooves 44a and 44b.

Further, three cam pin groups 45 are provided on the outer periphery of the cylinder 41. The three cam pin groups 45 are placed at equal intervals between them in a circumferential direction and have an equal height in a radial direction of the cylinder 41. Each of the cam pin groups 45 is formed of a front cam pin 45a and a rear cam pin 45b placed forward and rearward in the axial direction of the cylinder 41. The front cam pins 45a and the rear cam pins 45b are placed as slightly deflected in the circumferential direction. The front cam pins 45a are engaged with three front inner peripheral cam grooves 109a provided in a cam ring 78 (see FIG. 15) of the later-described lens barrel 71, respectively. The rear cam pins 45b are engaged with three rear inner peripheral cam grooves 109b of the cam ring 78, respectively.

The frame 42 is formed to have a shape larger than a plane shape of the second movable frame 4 and has a center through-hole 47 facing the fitting hole 11 of the first movable frame 3. As shown in FIG. 7, the frame 42 has: two coil insertion holes 49a and 49b continuous with the through-hole 47; the limiting projection 51; a fourth main bearing 52; and a second auxiliary bearing 53.

The coil insertion hole 49a is formed in a position corresponding to the first magnet 21A attached to the first movable frame 3 and is continuous with a (−) side in the first direction Y of the through-hole 47. The first coil 22A forming part of the first electric actuator 9A and a first hole element 26A showing a specific example of a position detector (see FIG. 5) are inserted into the coil insertion hole 49a. The coil insertion hole 49b is formed in a position corresponding to the second magnet 21B attached to the first movable frame 3 and is continuous with a (−) side in the second direction X of the through-hole 47. The second coil 22B forming part of the second electric actuator 9B, and a second hole element 26B showing a specific example of a position detector are inserted into the coil insertion hole 49b.

The limiting projection 51 is formed of a column protruding approximately vertically from a surface of the frame 42 facing the first movable frame 3. The limiting projection 51 is at a center of the limiting receiver hole 12 provided in the first movable frame 3 when the first movable frame 3 is in a reference position. The reference position of the first movable frame 3 is a position where the optical axis of the correction lens 2 fixed to the first movable frame 3 corresponds to the optical axis of the lens system when an image blur has not occur. The inner periphery of the limiting receiver hole 12 is brought into contact with the limiting projection 51 to limit movement of the first movable frame 3 in a direction perpendicular to the optical axis of the correction lens 2.

The fourth main bearing 52 is provided on a (+) side in the first direction Y on the surface of the frame 42 facing the first movable frame 3. The fourth main bearing 52 is formed of a pair of bearing pieces 52a and 52b placed at a predetermined interval between them in the second direction X. A fitting recess 52c is provided in each of the pair of bearing pieces 52a and 52b. Both edges of the second main guide shaft 8A are press-fit fixed to the fitting recesses 52c. The second main guide shaft 8A with both edges supported by the fourth main bearing 52 extends in the second direction X.

The second auxiliary bearing 53 is provided on a side opposite to the fourth main bearing 52 across the through-hole 47 on the surface of the frame 42 facing the first movable frame 3. That is, the second auxiliary bearing 53 is placed outside the coil insertion hole 49a in a radial direction. The second auxiliary bearing 53 is formed of a pair of bearing pieces 53a and 53b placed at a predetermined interval between them in the second direction X. A fitting recess 53c is provided in each of the pair of bearing pieces 53a and 53b. Both edges of the second auxiliary guide shaft 8B are press-fit fixed to the fitting recesses 53c. The second auxiliary guide shaft 8B is shorter than the second main guide shaft 8A and extends in the second direction X with both edges supported by the second auxiliary bearing 53.

The surface of the frame 42 facing the first movable frame 3 is provided with an interference avoiding recess 55 for avoiding interference between the first main bearing 13 of the first movable frame 3 and the second main bearing 33 of the second movable frame 4.

As shown in FIG. 6, a flexible wiring board 57 is fixed to a surface opposite to the surface of the frame 42 facing the first movable frame 3 using an adhesive, fixing screws or other fixing methods. The flexible wiring board 57 has a first coil mounting part 57a and a second coil mounting part 57b. As shown in FIG. 8, the first coil 22A and the first hole element 26A are mounted on the first coil mounting part 57a, and the second coil 22B and the second hole element 26B are mounted on the second coil mounting part 57b.

The first coil 22A and the first hole element 26A mounted on the first coil mounting part 57a are inserted into the coil insertion hole 49a of the frame 42 and face the first magnet 21A fixed to the first movable frame 3 (see FIG. 5). Similarly, the second coil 22B and the second hole element 26B mounted on the second coil mounting part 57b are inserted into the coil insertion hole 49b of the frame 42 and face the second magnet 21B fixed to the first movable frame 3.

The first and second coils 22A and 22B are formed by each winding one coil wire to obtain approximately oval flat coils. The two coils 22A and 22B are electrically connected to predetermined wiring patterns provided to the first coil mounting part 57a and the second coil mounting part 57b, respectively.

In the first coil 22A, two straight line parts on a long side facing each other in a width direction form thrust generation parts 23a and 23b each generating thrust as an actuator. Similarly, in the second coil 22B, two straight line parts on a long side facing each other in a width direction form thrust generation parts 24a and 24b each generating thrust as an actuator. The first coil 22A is provided so that the thrust generation parts 23a and 23b extend in a direction perpendicular to the first direction Y. The second coil 22A is provided so that the thrust generation parts 24a and 24b extend in a direction perpendicular to the second direction X.

As shown in FIG. 3, the thrust generation part 23a of the first coil 22A faces one magnetic pole of the first magnet 21A (north pole in this example). The thrust generation part 23b faces the other magnetic pole of the first magnet 21A (south pole in this example). As shown in FIG. 4, the thrust generation part 24a of the second coil 22B faces one magnetic pole of the second magnet 21B (north pole in this example). The thrust generation part 24b faces the other magnetic pole of the second magnet 21B (south pole in this example).

The first electric actuator 9A includes: the first magnet 21A attached to the first movable frame 3; and the first coil 22A attached to the fixed frame 5 through the flexible wiring board 57. The first electric actuator 9A generates thrust to move the first movable frame 3 in the first direction Y.

The second electric actuator 9B includes: the second magnet 21B attached to the first movable frame 3; and the second coil 22B attached to the fixed frame 5 through the flexible wiring board 57. The second electric actuator 9B generates thrust to move the second movable frame 4 in the second direction X through the first movable frame 3.

Here, thrust generated by the first and second electric actuators 9A and 9B will be described. When current is caused to flow in the first coil 22A, thrust directed in the first direction Y is generated in the first electric actuator 9A by the Fleming's left-hand rule, because a magnetic force of the first magnet 21A acts in a direction perpendicular to the first coil 22A. In this case, the first coil 22A has the two thrust generation parts 23a and 23b formed of straight line parts generating thrust, where current flows in directions reverse to each other. However, since the magnetic force of the first magnet 21A acts on the two thrust generation parts 23a and 23b also in directions reverse to each other, the two thrust generation parts 23a and 23b generate thrust in an identical direction.

Similarly, when current is caused to flow in the second coil 22B, thrust directed in the second direction X is generated in the second electric actuator 9B by the Fleming's left-hand rule, because a magnetic force of the second magnet 21B acts in a direction perpendicular to the second coil 22B. Also in this case, since the magnetic force of the second magnet 21B acts on the two thrust generation parts 24a and 24b of the second coil 22B in directions reverse to each other, the two thrust generation parts 24a and 24b where current flows in directions reverse to each other generate thrust in an identical direction.

The first hole element 26A has a detection part placed in a position almost overlapping a boundary between the north pole and the south pole (polar boundary) in the first magnet 21A. The first hole element 26A detects a magnetic force of the first magnet 21A and outputs a detection signal in response to an intensity of the detected magnetic force. A control part calculates a position of the correction lens 2 in the first direction Y based on the detection signal supplied from the first hole element 26A.

The second hole element 26B has a detection part placed in a position almost overlapping a boundary between the north pole and the south pole (polar boundary) in the second magnet 21B. The second hole element 26B detects a magnetic force of the second magnet 21B and outputs a detection signal in response to an intensity of the detected magnetic force. The control part calculates a position of the correction lens 2 in the second direction X based on the detection signal supplied from the second hole element 26B. Accordingly, the control part acquires information on positions of the correction lens 2 in the first direction Y and the second direction X and outputs a predetermined control signal to control driving of the correction lens 2 based on the position information.

The image blur correction device 1 having the aforementioned configuration may be assembled as follows, for example. First, the two magnets 21A and 21B are fitted in the two magnet recesses 15a and 15b of the first movable frame 3, respectively, and fixed thereto using an adhesive, or other fixing methods. Then, the correction lens 2 is fitted in the fitting hole 11 of the first movable frame 3 and fixed thereto using an adhesive, or other fixing methods. Accordingly, a first movable frame assembly is formed with the first movable frame 3, the correction lens 2 and the two magnets 21A and 21B integrated.

Next, the first auxiliary guide shaft 7B is fixed to the first auxiliary bearing 35 of the second movable frame 4. Specifically, both edges of the first auxiliary guide shaft 7B are fitted in and press-fit fixed to the fitting recesses 35c provided in the two bearing pieces 35a and 35b of the first auxiliary bearing 35.

Next, the first movable frame assembly is allowed to face one surface of the second movable frame 4, and the first auxiliary shaft engaging part 14 of the first movable frame 3 is engaged with the first auxiliary guide shaft 7B fixed to the first auxiliary bearing 35 of the second movable frame 4. Here, the first main bearing 13 of the first movable frame 3 is allowed to be present between the two bearing pieces 33a and 33b of the second main bearing 33 of the second movable frame 4. Then, the first main guide shaft 7A is inserted into the bearing holes 33c provided in the two bearing pieces 33a and 33b of the second main bearing 33 and the bearing hole 13a of the first main bearing 13, and both edges of the first main guide shaft 7A are press-fit fixed to the pair of bearing pieces 33a and 33b. Accordingly, the first movable frame 3 is supported by the second movable frame 4 to be movable in a specified direction (first direction Y).

Next, the first coil 22A and the first hole element 26A are mounted on one surface of the first coil mounting part 57a of the flexible wiring board 57, and the second coil 22B and the second hole element 26B are mounted on one surface of the second coil mounting part 57b of the flexible wiring board 57. Accordingly, a coil assembly is formed with the flexible wiring board 57, the two coils 22A and 22B and the two hole elements 26A and 26B integrated.

Next, the flexible wiring board 57 of the coil assembly is fixed to the frame 42 of the fixed frame 5 using an adhesive, fixing screws or other fixing methods. Accordingly, a fixed frame assembly is formed with the fixed frame 5 and the coil assembly integrated. Here, as shown in FIG. 7, the two coils 22A and 22B and the two hole elements 26A and 26B are inserted into the two coil insertion holes 49a and 49b of the fixed frame 5. The steps until the fixed frame assembly is formed may be performed before the steps until the first movable frame 3 is allowed to be movably supported by the second movable frame 4.

Next, the second auxiliary guide shaft 8B is fixed to the second auxiliary bearing 53 of the fixed frame 5. Specifically, both edges of the second auxiliary guide shaft 8B are fitted in and press-fit fixed to the fitting recesses 53c provided in the pair of bearing pieces 53a and 53b of the second auxiliary bearing 53. Next, the second main guide shaft 8A is inserted into the bearing hole 34a provided in the third main bearing 34 of the second movable frame 4, and both edges of the second main guide shaft 8A are allowed to protrude from both sides of the third main bearing 34.

Next, the first movable frame 3 supported by the second movable frame 4 is allowed to face the fixed frame assembly, and the second auxiliary shaft engaging part 36 of the second movable frame 4 is engaged with the second auxiliary guide shaft 8B fixed to the second auxiliary bearing 53 of the fixed frame 5. Then, both edges of the second main guide shaft 8A inserted into the third main bearing 34 of the second movable frame 4 are fixed to the fourth main bearing 52 of the fixed frame 5. Specifically, both edges of the second main guide shaft 8A are fitted in and press-fit fixed to the fitting recesses 52c provided in the pair of bearing pieces 52a and 52b of the fourth main bearing 52. Accordingly, the second movable frame 4 is supported by the fixed frame 5 to be movable in a specified direction (second direction X), so that the work for assembling the image blur correction device 1 is completed. As a result, the image blur correction device 1 as shown in FIGS. 1 and 2 is obtained.

The first movable frame 3, the second movable frame 4 and the fixed frame 5 are positioned by providing positioning holes in the respective members and inserting reference pins into the positioning holes, for example. Accordingly, the first movable frame 3 is relatively and temporarily fixed to the second movable frame 4 and the second movable frame 4 is relatively and temporarily fixed to the fixed frame 5, causing the positioning to be carried out simply and surely.

In the image blur correction device 1 assembled, the limiting projection 51 of the fixed frame 5 is inserted into the limiting receiver hole 12 of the first movable frame 3 (see FIG. 2). Accordingly, the inner periphery of the limiting receiver hole 12 is brought into contact with the limiting projection 51 to limit movement of the first movable frame 3 in a direction perpendicular to the optical axis of the correction lens 2.

In the image blur correction device 1 assembled, the first electric actuator 9A is placed between the correction lens 2 and the second auxiliary guide shaft 8B (see FIGS. 3 and 8). The second electric actuator 9B is placed between the correction lens 2 and the first auxiliary guide shaft 8A (see FIGS. 4 and 8). Here, the first and second main guide shafts 7A and 8A and the first and second auxiliary guide shafts 7B and 8B will be described.

If the first main bearing 13 has a long shape, backlash of the first movable frame 3 against the first main guide shaft 7A may be reduced, improving optical performance. Therefore, the first main guide shaft 7A may have to be long enough to correspond to a length of the first main bearing 13. Similarly, if the third main bearing 34 has a long shape, backlash of the second movable frame 4 against the second main guide shaft 8A may be reduced. Therefore, the second main guide shaft 8A may have to be long enough to correspond to a length of the third main bearing 34.

On the other hand, the first auxiliary shaft engaging part 14 may be short insofar as it is engaged with the first auxiliary guide shaft 7B. Therefore, the first auxiliary guide shaft 7B may be short in consideration of a sliding distance of the first auxiliary shaft engaging part 14. Similarly, the second auxiliary shaft engaging part 36 may be short insofar as it is engaged with the second auxiliary guide shaft 8B. Therefore, the second auxiliary guide shaft 8B may be short in consideration of a sliding distance of the second auxiliary shaft engaging part 36. Accordingly, in the present embodiment, the first and second auxiliary guide shafts 7B and 8B are set shorter than the first and second main guide shafts 7A and 8A.

In the present embodiment, the first auxiliary guide shaft 7B shorter than the first main guide shaft 7A is placed on an outer periphery of the fixed frame 5, and the second electric actuator 9B is placed between the first auxiliary guide shaft 7B and the correction lens 2. The second auxiliary guide shaft 8B shorter than the second main guide shaft 8A is placed on the outer periphery of the fixed frame 5, and the first electric actuator 9A is placed between the second auxiliary guide shaft 8B and the correction lens 2. Accordingly, a space opposite to the first main guide shaft 7A across the correction lens 2 and a space opposite to the second main guide shaft 8A across the correction lens 2 can be used efficiently. As a result, the diameter of fixed frame 5 may be reduced and the whole device may be reduced in size.

FIGS. 9A and 9B are views for comparing the size of an image blur correction device according to an embodiment of the present invention and an image blur correction device of the related art, where FIG. 9A is a view showing layout of the image blur correction device 1 according to an embodiment of the present invention and FIG. 9B is a view showing layout of an image blur correction device 300 of the related art.

As shown in FIG. 9B, in the image blur correction device 300 of the related art, a first main guide shaft 307A is placed on a (+) side in a second direction X with respect to a correction lens 302, and a first auxiliary guide shaft 307B is placed on a (−) side in the second direction X. A second main guide shaft 308A is placed on a (+) side in a first direction Y with respect to the correction lens 302, and a second auxiliary guide shaft 308B is placed on a (−) side in a first direction Y. A second electric actuator 309B is placed outside the first main guide shaft 307A, and a first electric actuator 309A is placed outside the second main guide shaft 308A. Therefore, when spaces are ensured for placing the first and second electric actuators 309A and 309B, a fixed frame 305 has a diameter L1.

On the other hand, as shown in FIG. 9A, in the image blur correction device 1 according to an embodiment of the present invention, the second electric actuator 9B is placed between the correction lens 2 and the first auxiliary guide shaft 7B and the first electric actuator 9A is placed between the correction lens 2 and the second auxiliary guide shaft 8B. Therefore, it is not necessary to ensure spaces for the electric actuators 9A and 9B outside the first and second main guide shafts 7A and 8A. Accordingly, the fixed frame 5 may have a diameter L2 smaller by 2 R than that of the fixed frame 305 of the image blur correction device 300 of the related art. As a result, the whole device may be reduced in size, and a lens barrel and an imaging apparatus including the image blur correction device may be reduced in size.

The fixed frame 5 may also be smaller in diameter than the fixed frame 300 of the related art by placing the first and second auxiliary guide shafts 7B and 8B close to the correction lens 2 and placing the first and second electric actuators 9A and 9B outside the auxiliary guide shafts. In this case, it may be necessary to separate the auxiliary guide shafts 7B and 8B and the correction lens 2 from each other at a predetermined distance in order to engage the first auxiliary shaft engaging part 14 of the first movable frame 3 and the second auxiliary shaft engaging part 36 of the second movable frame 4 with the first and second auxiliary guide shafts 7B and 8B, respectively.

Specifically, it may be necessary to make the spaces opposite to the first and second main guide shafts 7A and 8A across the correction lens 2 larger than those in the case where the first electric actuator 9A is placed between the second auxiliary guide shaft 8B and the correction lens 2 and the second electric actuator 9B is placed between the first auxiliary guide shaft 7B and the correction lens 2. Accordingly, in order to reduce the diameter of fixed frame 5 so as to reduce the whole device in size, it is preferable to place the first electric actuator 9A between the second auxiliary guide shaft 8B and the correction lens 2 and place the second electric actuator 9B between the first auxiliary guide shaft 7B and the correction lens 2.

Further, as shown in FIG. 8, in the image blur correction device 1 assembled, the components are placed symmetrically with respect to a line connecting the pair of rectilinear guide grooves 44a and 44b of the fixed frame 5. Specifically, the first main guide shaft 7A, the second auxiliary guide shaft 8B and the first electric actuator 9A are placed symmetrically to the second main guide shaft 8A, the first auxiliary guide shaft 7B and the second electric actuator 9B with respect to the line connecting the pair of rectilinear guide grooves 44a and 44b of the fixed frame 5. Therefore, spaces for forming the rectilinear guide grooves 44a and 44b may be ensured in positions not interfering with a component such as the first main guide shaft 7A. As a result, it is not necessary to increase the diameter of fixed frame 5 to form the rectilinear guide grooves 44a and 44b, and the whole device may be reduced in size.

The image blur correction device 1 with such a configuration may act as follows, for example. The correction lens 2 of the image blur correction device 1 may be moved by supplying an appropriate value of driving current selectively or simultaneously to each of the coils 22A and 22B of the first and second electric actuators 9A and 9B through the flexible wiring board 57.

Specifically, the first coil 22A and the second coil 22B of the image blur correction device 1 are fixed to the fixed frame 5 through the flexible wiring board 57. Here, each of the thrust generation parts 23a and 23b of the first coil 22A extends in the second direction X, and each of the thrust generation parts 24a and 24b of the second coil 22B extends in the first direction Y. The first magnet 21A fixed to the first movable frame 3 is placed facing the first coil 22A, and the second magnet 21B fixed thereto is placed facing the second coil 22B.

As a result, a magnetic flux of a magnetic circuit formed by the first magnet 21A acts to be transmitted through each of the thrust generation parts 23a and 23b of the first coil 22A approximately perpendicularly. Similarly, a magnetic flux of a magnetic circuit formed by the second magnet 21B acts to be transmitted through each of the thrust generation parts 24a and 24b of the second coil 22B approximately perpendicularly. Each of the magnets 21A and 21B is fixed to the first movable frame 3 supported by the fixed frame 5 to be movable through the second movable frame 4. Therefore, the correction lens 2 may be moved through the first movable frame 3 within a predetermined range in any direction on a plane including the first direction Y and the second direction X, that is, within a range limited by the limiting projection 51 and the limiting receiver hole 12.

When current is caused to flow in the first coil 22A of the first electric actuator 9A, the current flows in the second direction X in each of the thrust generation parts 23a and 23b of the first coil 22A, because each of the thrust generation parts 23a and 23b extends in the second direction X. Here, since a magnetic flux of the first magnet 21A acts in a direction approximately perpendicular to each of the thrust generation parts 23a and 23b, thrust directed in the first direction Y acts on the first magnet 21A according to the Fleming's rule. Accordingly, the first movable frame 3 to which the first magnet 21A is fixed is moved in the first direction Y. As a result, the correction lens 2 held in the first movable frame 3 is moved in the first direction Y in response to a magnitude of current caused to flow in the first coil 22A.

Similarly, when current is caused to flow in the second coil 22B of the second electric actuator 9B, the current flows in the first direction Y in each of the thrust generation parts 24a and 24b of the second coil 22B, because each of the thrust generation parts 24a and 24b extends in the first direction Y. Here, since a magnetic flux of the second magnet 21B acts in a direction approximately perpendicular to each of the thrust generation parts 24a and 24b, thrust directed in the second direction X acts on the second magnet 21B according to the Fleming's rule. Accordingly, the first movable frame 3 to which the second magnet 21B is fixed is moved in the second direction X through the second movable frame 4. As a result, the correction lens 2 held in the first movable frame 3 is moved in the second direction X in response to a magnitude of current caused to flow in the second coil 22B.

When current is caused to flow in the first coil 22A and the second coil 22B at the same time, movement by the first coil 22A and movement by the second coil 22B are performed in a combined manner. Specifically, the correction lens 2 is moved in the first direction Y by an action of current flowing in the first coil 22A, and at the same time the correction lens 2 is moved in the second direction X by an action of current flowing in the second coil 22B. As a result, the correction lens 2 is obliquely moved to correct an image blur.

In the present embodiment, the first and second magnets 21A and 21B are fixed to the first movable frame 3, and the first and second coils 22A and 22B are fixed to the fixed frame 5 to form a moving magnet-type electric actuator (driving part). However, an electric actuator (driving part) according to an embodiment of the present invention may be a moving-coil type electric actuator having the first and second magnets 21A and 21B fixed to the fixed frame 5 and having the first and second coils 22A and 22B fixed to the first movable frame 3.

Figure 10:
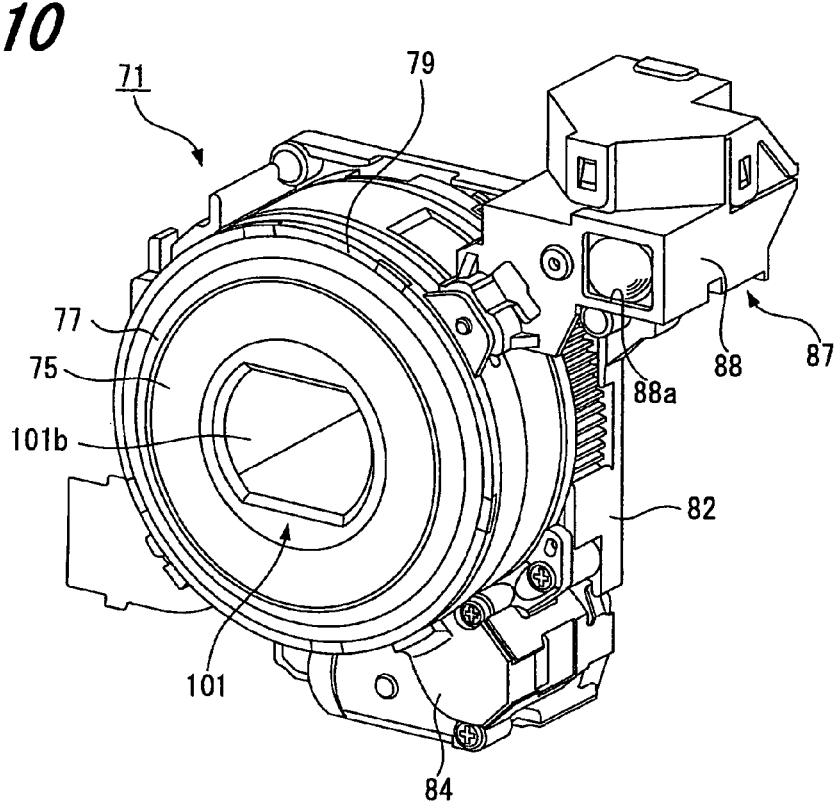
FIG. 10 is a perspective view showing a barrel stored state of a first example of a lens barrel according to an embodiment of the present invention.
Figure 11:
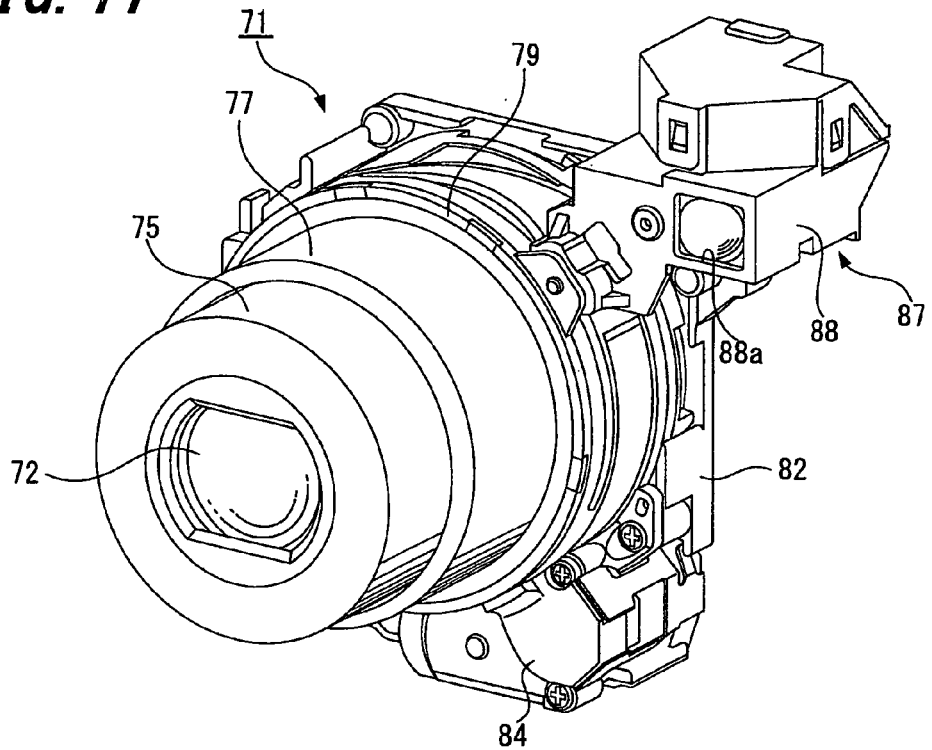
FIG. 11 is a perspective view showing a barrel extended state of a first example of a lens barrel according to an embodiment of the present invention.
Figure 12:
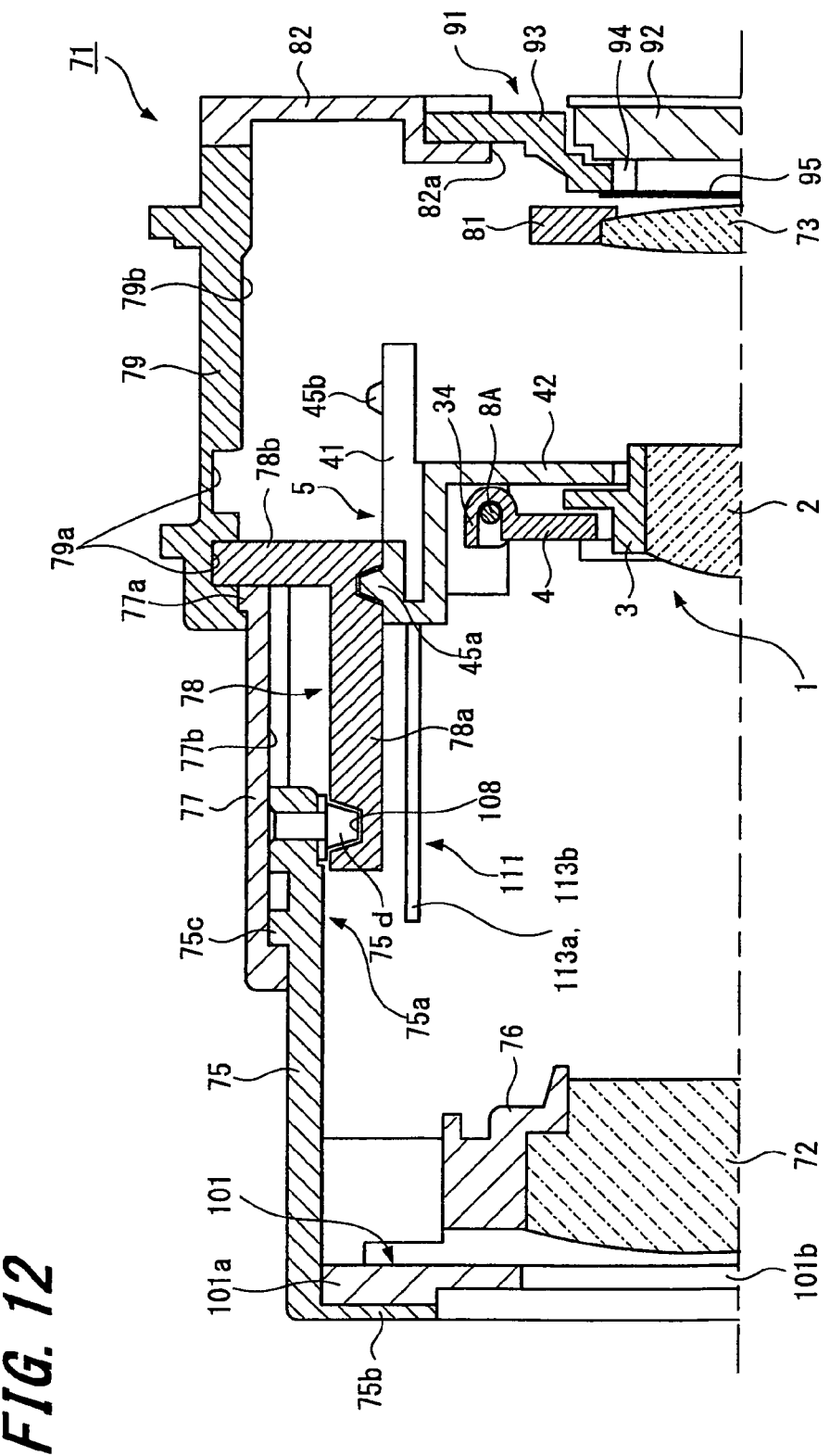
FIG. 12 is a view showing a longitudinal section of the barrel extended state of the lens barrel shown in FIG. 11.
Figure 13:
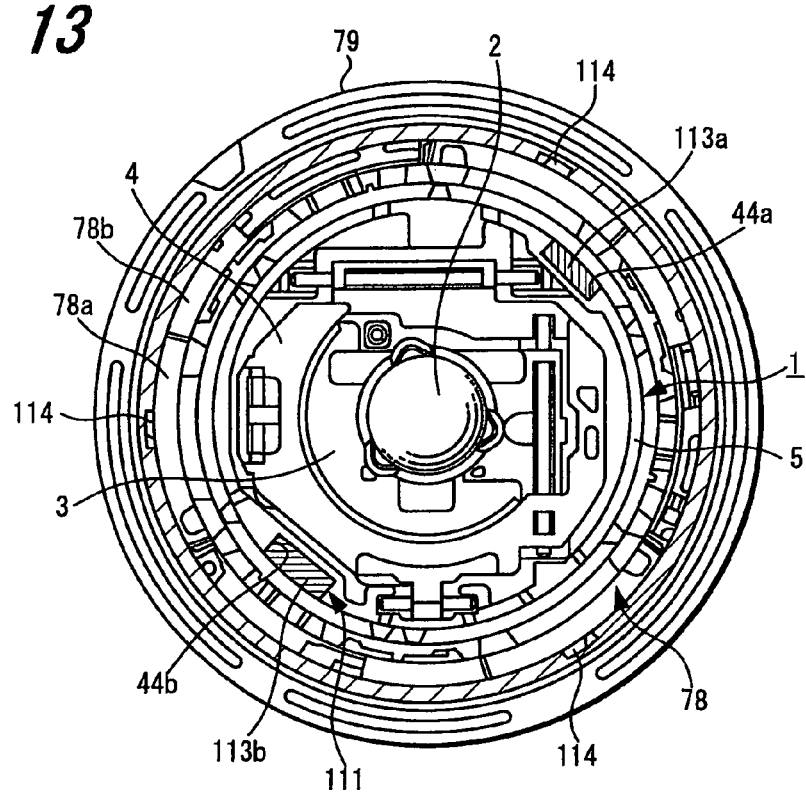
FIG. 13 is a view showing a cross section of the barrel extended state of the lens barrel shown in FIG. 11.
Figure 14:
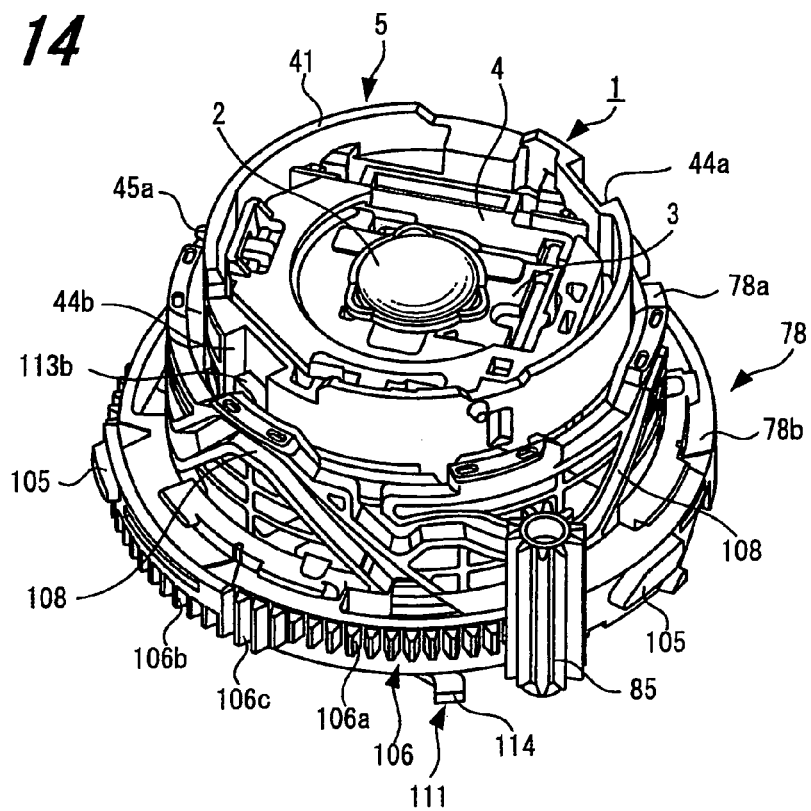
FIG. 14 is a perspective view showing a state where a rotating member, a rotation restricting member and an image blur correction device of a first example of a lens barrel according to an embodiment of the present invention are engaged with each other.
Figure 15:
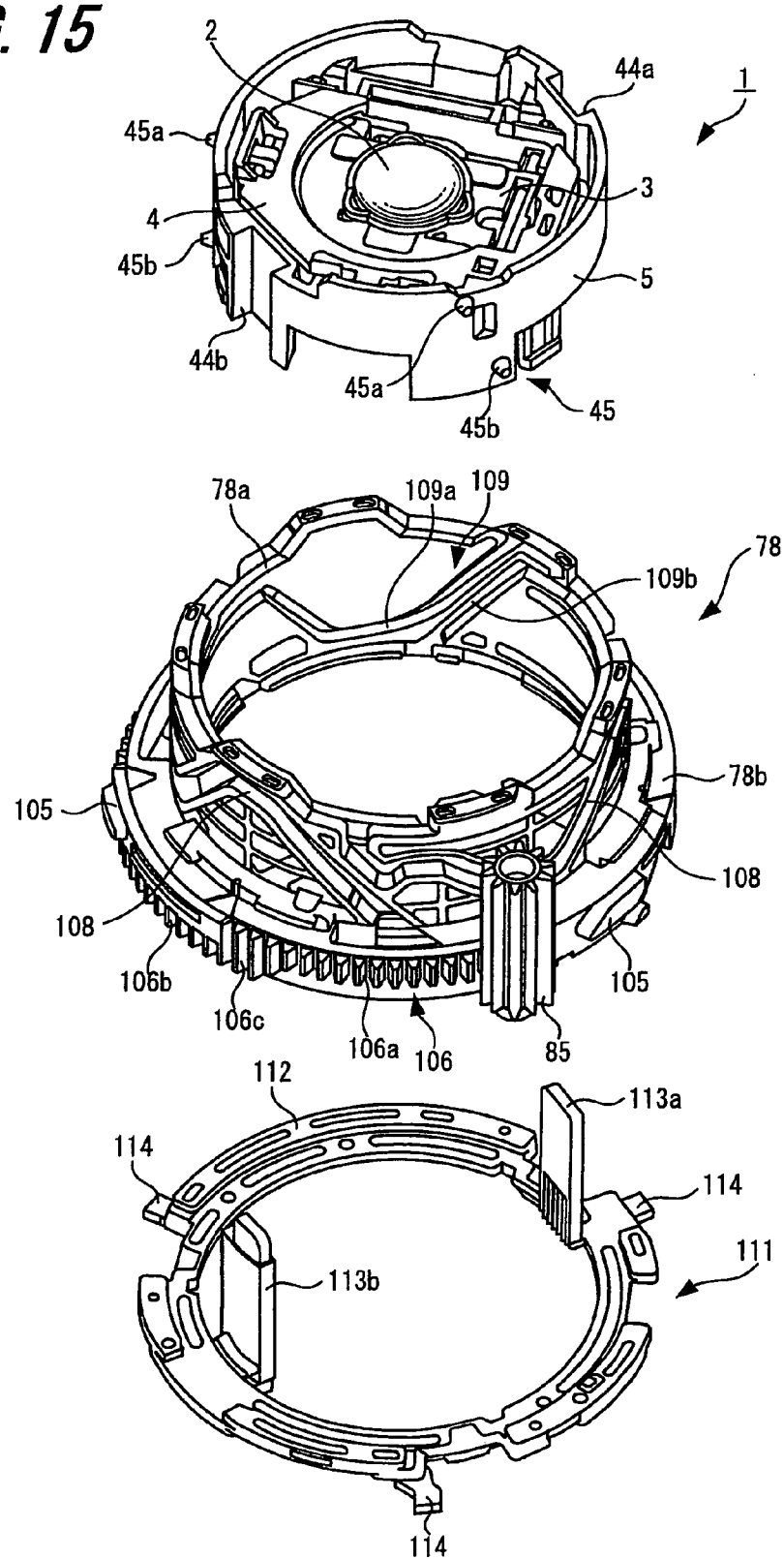
FIG. 15 is an exploded perspective view of a rotating member, a rotation restricting member and an image blur correction device of a first example of a lens barrel according to an embodiment of the present invention arranged in an optical axis direction.
Figure 16A:
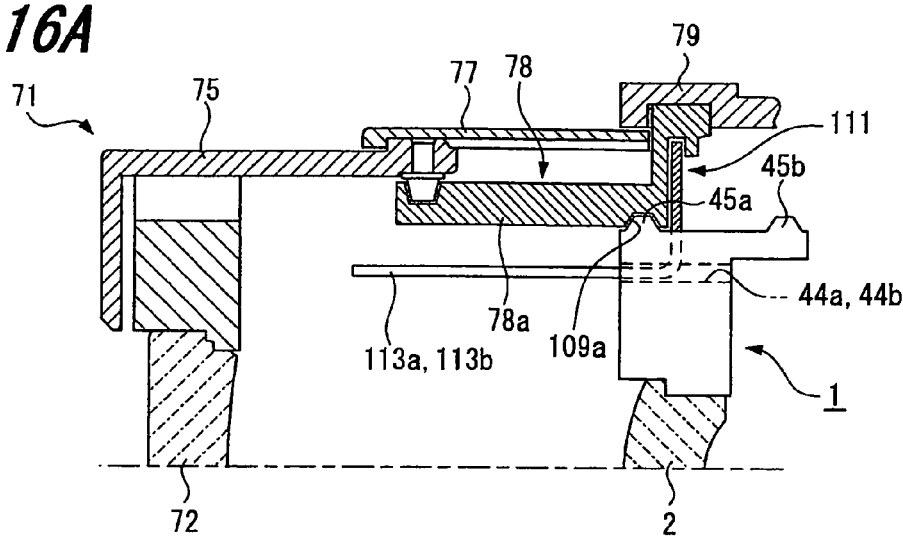
Figure 16B:
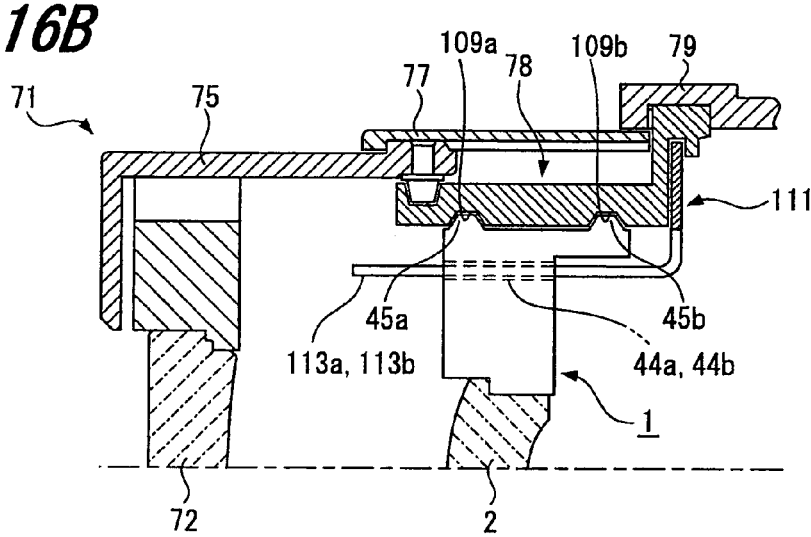
Figure 16C:
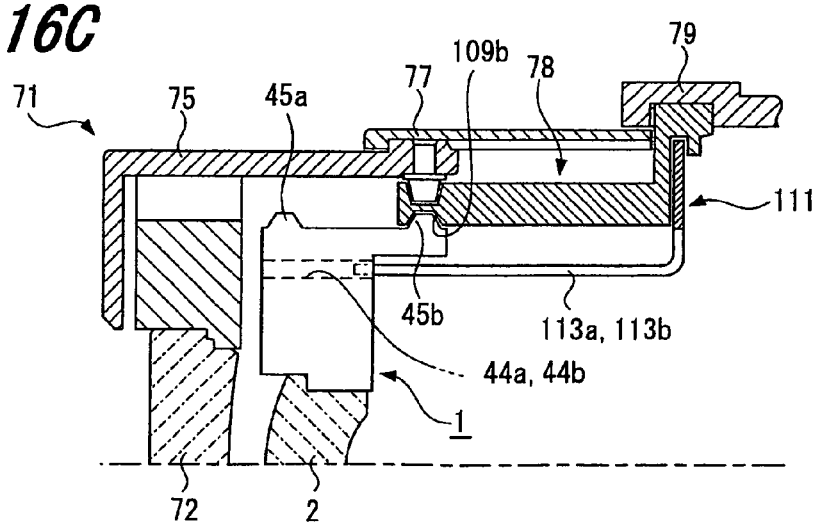

Next, a first example of a lens barrel according to an embodiment of the present invention including the image blur correction device 1 having the aforementioned configuration and action will be described with reference to FIGS. 10 to 16. FIG. 10 is a perspective view showing a barrel stored state of a first example of a lens barrel according to an embodiment of the present invention. FIG. 11 is a perspective view showing a barrel extended state of the same. FIG. 12 is a view showing a longitudinal section of the barrel extended state. FIG. 13 is a view showing a cross section of the same. FIG. 14 is a perspective view of a state where a rotating member, a rotation restricting member and the image blur correction device 1 of the lens barrel are engaged with each other. FIG. 15 is an exploded perspective view of a rotating member, a rotation restricting member and the image blur correction device 1 arranged in an optical axis direction. FIGS. 16A to 16C are views describing optical zooming using a rotating member and the image blur correction device 1.

The lens barrel 71 showing a first example of a lens barrel according to an embodiment of the present invention includes: a lens system including a plurality of lenses; a mechanical system such as a ring or a frame fixing respective components of the lens system or supporting the components to be movable; and a power system such as a motor or a gear operating the mechanical system.

As shown in FIG. 12, the lens system of the lens barrel 71 includes: a first lens group 72 formed of a combination of a plurality of lenses; the correction lens 2 which is a second lens group formed of a combination of a plurality of lenses and corrects an image blur in the lens system; and a third lens group 73 formed of one lens or a combination of two or more lenses. The lens system exhibits a zooming function using the first lens group 72 and the correction lens 2 and performs zooming when the first lens group 72 and the correction lens 2 are moved in a predetermined amount in an optical axis direction. The lens system exhibits a focusing function using the third lens group 73 and performs focusing when the third lens group 73 is moved in a predetermined amount in the optical axis direction.

The mechanical system of the lens barrel 71 includes: a first group ring 75 showing a specific example of a rectilinear member; a first group lens frame 76 holding the first lens group 72; the image blur correction device 1 having the correction lens 2 as a second lens group; a rectilinear ring 77; the cam ring 78 showing a specific example of a rotating member; a fixed ring 79 fixed to a main body of a camera such as a digital still camera; a third group lens frame 81 holding the third lens group 73; and a rear barrel 82 fixed to a rear part of the fixed ring 79, in the order from an object.

The motor system of the lens barrel 71 includes: a zoom motor 84 rotating the cam ring 78 (see FIGS. 10 and 11); a reduction gear unit (not shown) and a driving gear 85 (see FIG. 14); and an F motor unit (not shown) for focusing an optical system on an object. The zoom motor 84, the reduction gear unit and the F motor unit are attached to an assembly of the fixed ring 79 and the rear barrel 82. The driving gear 85 is rotatably supported by the fixed ring 79 and the rear barrel 82.

As shown in FIGS. 10 and 11, an optical finder 87 is attached to the assembly of the fixed ring 79 and the rear barrel 82. The optical finder 87 has a finder case 88 including: a front window 88a exposed on a front surface of an imaging apparatus such as a digital still camera; and a peep window 88b exposed on a rear surface of the imaging apparatus (see FIG. 19). A finder lens system formed of a fixed lens and a movable lens is provided in the finder case 88, allowing the user to view a range of an object approximately equal to an image obtained by the lens system of the lens barrel 71.

As shown in FIG. 12, an imaging-device unit 91 is attached to the rear barrel 82. The imaging-device unit 91 includes a solid-state imaging device 92 such as a CCD image sensor, an adapter 93 and a seal rubber 94. The adapter 93 is formed of a frame fitted in a through-hole 82a of the rear barrel 82 and is fixed to the rear barrel 82 using an adhesive, fixing screws or other fixing methods. The solid-state imaging device 92 has a light receiving surface facing an opening of the adapter 93 and is fixed to the adapter 93 through the seal rubber 94. A low-pass filter 95 is placed in front of the light receiving surface of the solid-state imaging device 92. The low-pass filter 95 is detachably held by the adapter 93 using a filter presser (not shown).

The fixed ring 79 fixed to a front part of the rear barrel 82 is formed of an approximate cylinder forming an exterior of the lens barrel 71, and the whole lens system may be stored in the fixed ring 79. An inner periphery of the fixed ring 79 has: three cam grooves 79a having an approximately identical cam curve (two of which are shown in FIG. 12); and six rectilinear guide grooves 79b linearly extending in the optical axis direction (one of which is shown in FIG. 12). Later-described three cam projections 105 of the cam ring 78 are slidably engaged with the three cam grooves 79a of the fixed ring 79, respectively. The six rectilinear guide grooves 79b guide the rectilinear ring 77 and the later-described rotation restricting member 111 in the optical axis direction.

The rectilinear ring 77 is formed of a cylinder into which the first group ring 75 is inserted, and has six protrusions 77a provided on one edge in an axial direction and externally protruding in a radial direction (one of which is shown in FIG. 12). The six protrusions 77a are slidably engaged with the six rectilinear guide grooves 79b provided on the inner periphery of the fixed ring 79, respectively. An inner periphery of the rectilinear ring 77 has three rectilinear guide grooves 77b (one of which is shown in FIG. 12). The three rectilinear guide grooves 77b are placed at approximately equal intervals between them in a circumferential direction and linearly extend parallel to each other in the optical axis direction. Later-described three guide projections 75c of the first group ring 75 are slidably engaged with the three rectilinear guide grooves 77b, respectively.

The first group ring 75 is formed of a cylinder into which the cam ring 78 is inserted, and has: three brackets 75a provided at one end (rear side) in the axial direction and protruding rearward; and an inner flange 75b continuous with a front side that is the other end in the axial direction and extending internally in a radial direction. The three brackets 75a are provided at equal intervals between them in the circumferential direction. The three brackets 75a have: the guide projections 75c protruding externally in a radial direction; and three cam pins 75d protruding internally in a radial direction, respectively.

The guide projection 75c is formed integrally with the bracket 75a so as to be built on part of the bracket 75a. The cam pin 75d is provided integrally with the bracket 75a by press-fitting a separate member. The three guide projections 75c are slidably engaged with the three rectilinear guide grooves 77b of the rectilinear ring 77, respectively. The three cam pins 75d are slidably engaged with later-described three outer cam grooves 108 of the cam ring 78, respectively.

A front edge of the first group ring 75 has a lens barrier unit 101 protecting the lens system by closing an optical path as a photographing aperture during non-photographing. The lens barrier unit 101 includes: a ring-shaped barrier main body 101a fixed to the inner flange 75b of the first group ring 75; a pair of opening/closing blades 101b rotatably supported by the barrier main body 101a (see FIGS. 10 and 12); and a blade opening/closing mechanism (not shown) opening and closing the pair of opening/closing blades 101b.

The cam ring 78 is placed within the fixed ring 79. As shown in FIGS. 13 and 14, the rotation restricting member 111 and the image blur correction device 1 are fitted in the cam ring 78, respectively. As shown in FIGS. 14 and 15, the cam ring 78 is formed of: a cylindrical body 78a having an outside diameter slightly smaller than an inside diameter of the fixed ring 79; and a flange 78b continuous with one end surface of the body 78a. The flange 78b extends externally in a radial direction. The flange 78b of the cam ring 78 has the three cam projections 105 placed at approximately equal intervals between them in the circumferential direction (two of which are shown in FIGS. 14 and 15). The three cam projections 105 are slidably engaged with the three cam grooves 79a provided on the inner periphery of the fixed ring 79, respectively.

The flange 78b of the cam ring 78 has a gear 106 formed with spur teeth. The gear 106 includes: a first gear 106a formed on a side of the body 78a; a second gear 106b formed on a side opposite to the body 78a; and a third gear 106c connecting the first gear 106a to the second gear 106b and having a facewidth equal to those of the first and second gears 106a and 106b in total.

A length of the gear 106 in the circumferential direction has a necessary number of gear teeth to rotate the cam ring 78 at a predetermined angle. The driving gear 85 is always engaged with any of the first to third gears 106a to 106c. Accordingly, when the driving gear 85 is rotationally driven by actuation of the zoom motor 84 (see FIG. 10) and the reduction gear unit (not shown), the cam ring 78 is rotated leftward or rightward according to a rotation direction of the driving gear 85. When the cam ring 78 is rotated by the driving gear 85, the cam ring 78 is moved in the axial direction at the same time. Here, the driving gear 85 is set to have a facewidth sufficiently longer than an amount of movement (stroke) of the cam ring 78 in the axial direction. Therefore, the cam ring 78 is rotated within a predetermined range with the driving gear 85 always engaged with the gear 106.

An outer periphery of the body 78a of the cam ring 78 has the three outer cam grooves 108 having an identical cam curve (track) (two of which are shown in FIGS. 14 and 15). The three cam pins 75d of the first group ring 75 supporting the first lens group 72 (see FIG. 12) are slidably engaged with the three outer cam grooves 108, respectively. The three outer cam grooves 108 are placed at approximately equal intervals in the circumferential direction, allow the first group ring 75 to move in the optical axis direction and allow the lens barrel 71 to carry out optical zooming and barrel storage.

An inner periphery of the body 78a of the cam ring 78 has three inner cam groove groups 109 having an identical cam curve (track) provided at equal intervals between them in the circumferential direction (one of which is shown in FIG. 15). The three inner cam groove groups 109 are each formed of a combination of a front inner peripheral cam groove 109a and a rear inner peripheral cam groove 109b having an identical cam curve (track). The front inner peripheral cam groove 109a and the rear inner peripheral cam groove 109b are placed at a predetermined interval between them in the axial direction of the body 78a which is the optical axis direction, and are also set to be slightly deflected in the circumferential direction and provided to be slightly twisted with each other.

The front cam pins 45a provided in the fixed frame 5 of the image blur correction device 1 are slidably engaged with the front inner peripheral cam grooves 109a, respectively. The rear cam pins 45b of the fixed frame 5 are slidably engaged with the rear inner peripheral cam grooves 109b, respectively. The three inner cam groove groups 109 each including the front inner peripheral cam groove 109a and the rear inner peripheral cam groove 109b allow the image blur correction device 1 having the correction lens 2 as a second lens group to move in the optical axis direction and allow the lens barrel 71 to carry out optical zooming and barrel storage.

The rotation restricting member 111 rotatable in the rotation direction but restricted to be unmovable in the optical axis direction is fitted to the flange 78b of the cam ring 78 having such a configuration. The rotation restricting member 111 has: a ring 112 having an outside diameter and an inside diameter approximately equal to those of the body 78a of the cam ring 78; the two rectilinear guide pieces 113a and 113b continuous with an inner periphery of the ring 112; and three projection pieces 114 continuous with an outer periphery of the ring 112.

The two rectilinear guide pieces 113a and 113b of the rotation restricting member 111 are placed facing each other in positions rotationally displaced at 180° and are formed protruding in a direction perpendicular to a plane direction of the ring 112. The two rectilinear guide pieces 113a and 113b are slidably engaged with the pair of rectilinear guide grooves 44a and 44b provided in the fixed frame 5 of the image blur correction device 1, respectively. The three projection pieces 114 are formed protruding externally in a radial direction at predetermined intervals between them in the circumferential direction. The three projection pieces 114 are slidably engaged with the rectilinear guide grooves 79b of the fixed ring 79.

The image blur correction device 1 is attached to an inner periphery of the cam ring 78 and is movable only in the optical axis direction due to restriction of its rotation by the rotation restricting member 111. In a state where the image blur correction device 1 is attached to the inner periphery of the cam ring 78 (see FIG. 14), the front cam pins 45a of the cam pin groups 45 provided to the fixed frame 5 are engaged with the front inner peripheral cam grooves 109a of the inner cam groove groups 109, and the rear cam pins 45b are engaged with the rear inner peripheral cam grooves 109b. The rectilinear guide pieces 113a and 113b of the rotation restricting member 111 are engaged with the pair of rectilinear guide grooves 44a and 44b provided to the fixed frame 5. On the other hand, the three projection pieces 114 of the rotation restricting member 111 are slidably engaged with the first rectilinear guide grooves 79b of the fixed ring 79, respectively. Therefore, when the cam ring 78 is rotated, the image blur correction device 1 is not rotated relative to the fixed ring 79 and is moved forward and backward only in the optical axis direction along the cam curve of the inner cam groove groups 109 determined by the front inner peripheral cam grooves 109a and the rear inner peripheral cam grooves 109b.

The rotation restricting member 111 has the three projection pieces 114 engaged with the rectilinear guide grooves 79b of the fixed ring 79. Therefore, the rotation restricting member 111 is not rotated relative to the fixed ring 79 and is moved integrally with the fixed ring 79 in the optical axis direction at a distance where the cam ring 78 is moved in the optical axis direction. Similarly, the rectilinear ring 77 has the six protrusions 77a engaged with the six rectilinear guide grooves 79b of the fixed ring 79. Therefore, similar to the rotation restricting member 111, the rectilinear ring 77 is not rotated relative to the fixed ring 79 and is moved integrally with the fixed ring 79 in the optical axis direction at a distance where the cam ring 78 is moved in the optical axis direction.

The three guide projections 75c of the first group ring 75 are engaged with the three rectilinear guide grooves 77b provided on the inner periphery of the rectilinear ring 77, respectively. The three cam pins 75d are engaged with the three outer cam grooves 108 provided on an outer periphery of the cam ring 78. Therefore, the first group ring 75 is moved forward and backward in the optical axis direction without rotation in response to an amount of rotation of the cam ring 78.

Next, optical zooming carried out using the cam ring 78 and a cam mechanism of the image blur correction device 1 will be described with reference to FIGS. 16A to 16C. FIG. 16A is a view describing a state where the rear cam pins 45b of the image blur correction device 1 are detached from the rear inner peripheral cam grooves 109b of the cam ring 78. FIG. 16B is a view describing a state where the front cam pins 45a and the rear cam pins 45b are engaged with the front inner peripheral cam grooves 109a and the rear inner peripheral cam grooves 109b, respectively. FIG. 16C is a view describing a state where the front cam pins 45a are detached from the front inner peripheral cam grooves 109a.

In a barrel stored state (see FIG. 10), the image blur correction device 1 is completely stored in the cam ring 78. Here, the front cam pins 45a of the image blur correction device 1 are engaged with the front inner peripheral cam grooves 109a of the cam ring 78, and the rear cam pins 45b protrude rearward from the body 78a of the cam ring 78 and are not engaged with the rear inner peripheral cam grooves 109b. When the cam ring 78 in the barrel stored state is rotated in an extending direction, the front cam pins 45a slide in the front inner peripheral cam grooves 109a. Here, since the rectilinear guide pieces 113a and 113b of the rotation restricting member 111 are engaged with the rectilinear guide grooves 44a and 44b, the image blur correction device 1 is moved in the optical axis direction without rotation and then is in a state shown in FIG. 16A.

When the cam ring 78 in the state shown in FIG. 16A is further rotated in the extending direction, the front cam pins 45a slide in the front inner peripheral cam grooves 109a and the rear cam pins 45b are cam engaged with the rear inner peripheral cam grooves 109b. Thus, as shown in FIG. 16B, the front and rear cam pins 45a and 45b are cam engaged with the front and rear inner peripheral cam grooves 109a and 109b, respectively. Here, since the rectilinear guide pieces 113a and 113b of the rotation restricting member 111 are engaged with the rectilinear guide grooves 44a and 44b, the image blur correction device 1 is moved in the optical axis direction without rotation.

When the cam ring 78 in the state shown in FIG. 16B is further rotated in the extending direction, the front and rear cam pins 45a and 45b slide in the front and rear inner peripheral cam grooves 109a and 109b and the image blur correction device 1 is further moved in the optical axis direction. Then, as shown in FIG. 16C, the front cam pins 45a are detached from the front inner peripheral cam grooves 109a, and the image blur correction device 1 is moved in the optical axis direction with only the rear cam pins 45b cam engaged with the rear inner peripheral cam grooves 109b. When a photographing state is changed to a non-photographing state, movement of the image blur correction device 1 is reverse to the aforementioned movement.

The image blur correction device 1 in a normal state is arranged such that the optical axis of the correction lens 2 is on the optical axis of the other lens system in the lens barrel 71. When an image blur occurs on an image forming surface of the solid-state imaging device 92 due to shake, vibration or the like acting on the lens barrel 71, the image blur correction device 1 moves the correction lens 2 in two directions perpendicular to the optical axis of the lens system (the first direction Y and the second direction X as described above) to correct the image blur on the image forming surface.

An image blur detector (not shown) detects shake, vibration or the like acting on the lens barrel 71. A gyro sensor may be used as the image blur detector, for example. The gyro sensor is mounted in a camera together with the lens barrel 71. The gyro sensor detects an acceleration, an angular velocity, an angular acceleration or the like acting on the lens barrel 71 due to trembling, shake or the like of hands of a photographer. Information such as the acceleration or angular velocity detected by the gyro sensor is supplied to a control device.

The control device controls driving of the first electric actuator 9A and/or the second electric actuator 9B to form an image in a predetermined position on the image forming surface of the solid-state imaging device 92. Specifically, driving of the first electric actuator 9A is controlled against shake in the first direction Y to move the first movable frame 3 in the first direction Y. Driving of the second electric actuator 9B is controlled against shake in the second direction X to move the second movable frame 4 in the second direction X through the first movable frame 3.

Figure 17:
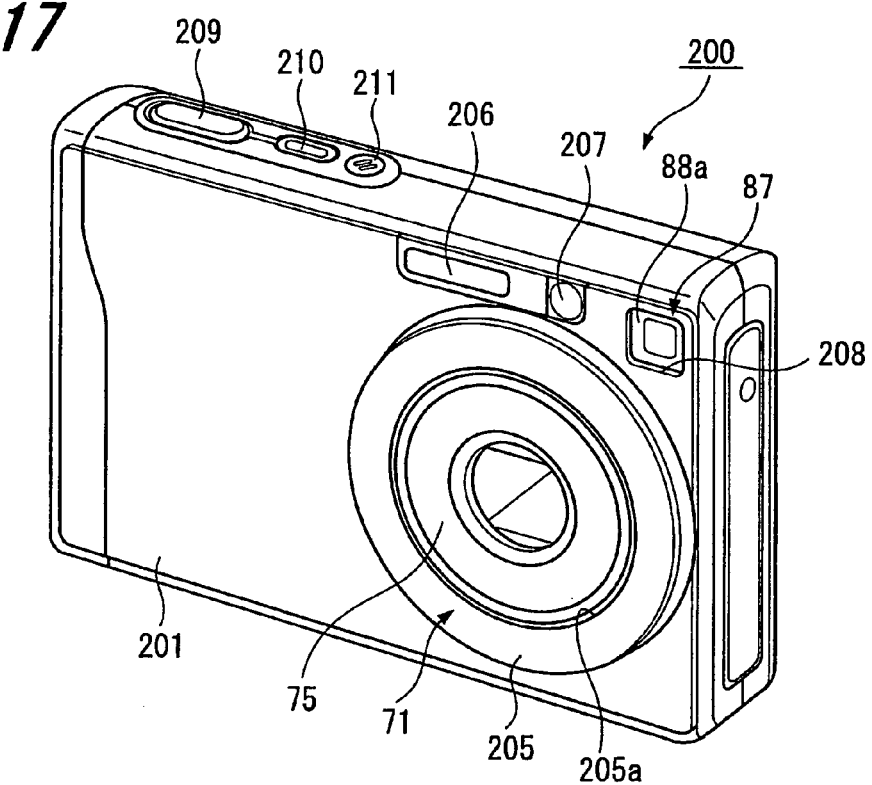
FIG. 17 is a front perspective view showing a barrel stored state of a first example of an imaging apparatus according to an embodiment of the present invention.
Figure 18:
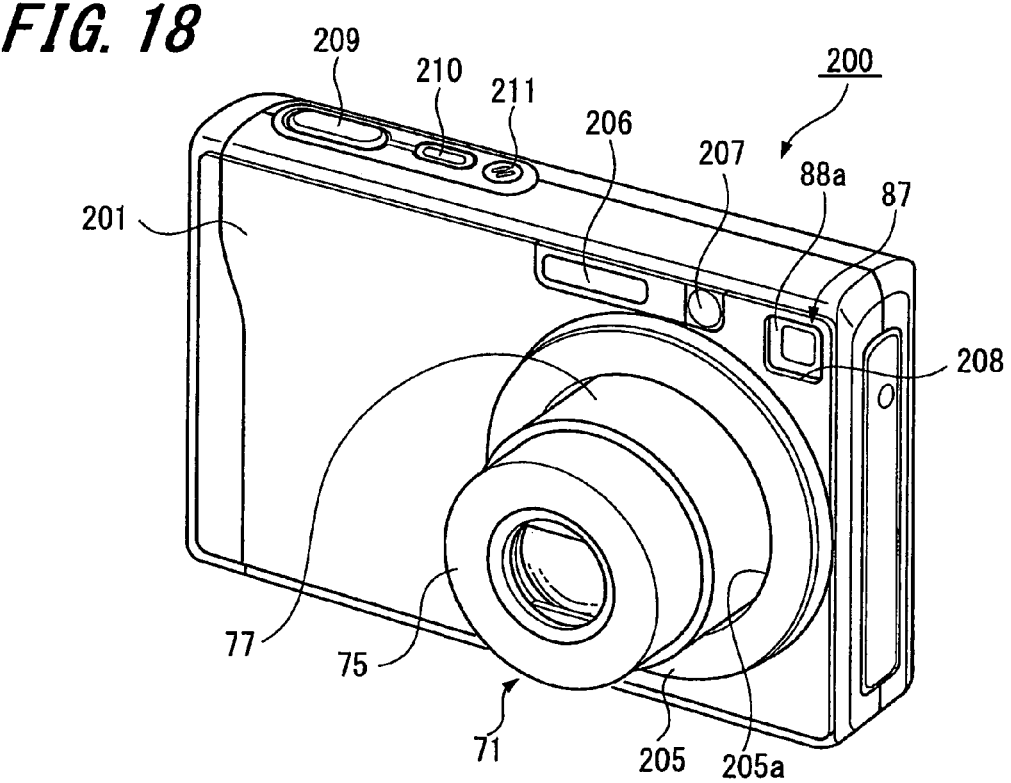
FIG. 18 is a front perspective view showing a barrel extended state of a first example of an imaging apparatus according to an embodiment of the present invention.
Figure 19:
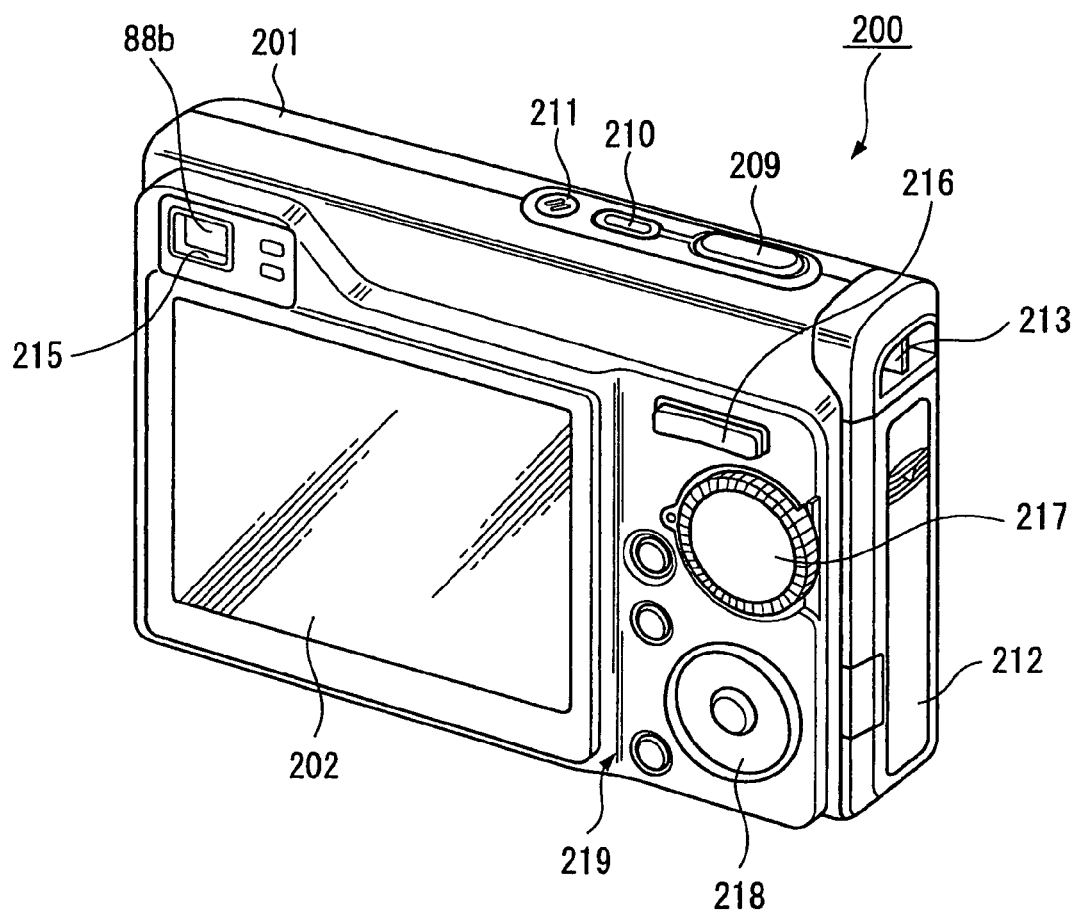
FIG. 19 is a rear view showing a first example of an imaging apparatus according to an embodiment of the present invention.

Next, a digital still camera 200 showing a first example of an imaging apparatus including the lens barrel 71 having the aforementioned configuration will be described with reference to FIGS. 17 to 19. FIG. 17 is a front perspective view of a barrel stored state of the digital still camera 200. FIG. 18 is a front perspective view of the barrel extended state. FIG. 19 is a rear perspective view of the digital still camera 200.

The digital still camera 200 shown in FIGS. 17 to 19 uses a semiconductor recording medium as an information recording medium. The digital still camera 200 may convert an optical image from an object to an electric signal using the solid-state imaging device 92 in the aforementioned lens barrel 71, and record the signal in a semiconductor recording medium or display an image based on the electric signal on a display panel such as a liquid crystal display.

The digital still camera 200 includes: a camera main body 201 showing a specific example of a device main body; the lens barrel 71 capturing an image of an object as light and guiding the light to the solid-state imaging device 92; a flat display panel 202 formed of a liquid crystal display or the like displaying an image based on a video signal output from the solid-state imaging device 92; a control part (see FIG. 21) controlling movement of the lens barrel 71, display in the flat display panel 202, and the like; and a battery power supply (not shown).

The camera main body 201 of the digital still camera 200 is in the shape of a horizontally long flat cylinder. As shown in FIGS. 17 and 18, a face ring 205 is attached to one side on a front surface of the camera main body 201. The first group ring 75 and the like movable forward and backward on a front surface of the lens barrel 71 face a center hole 205a of the face ring 205. When the power supply of the digital still camera 200 is turned on, the lens barrel 71 is extended forward (see FIG. 18). When the power supply of the digital still camera 200 is turned off, the lens barrel 71 is stored in the camera main body 201 (see FIG. 17).

A light emitting part 206 of a flash device; a light emitting/receiving part 207 of an auto-focus mechanism; and an opening window 208 exposing the front window 88a of the optical finder 87 attached to the lens barrel 71 are provided above the lens barrel 71 on the front surface of the camera main body 201. A shutter button 209; a power supply button 210; and a sound collecting hole 211 of a sound collector such as a microphone are arranged on the top surface of the camera main body 201.

As shown in FIG. 19, a battery cover 212 opening and closing a battery storage part in which a battery is detachably stored, and a strap attaching part 213 are arranged on one side surface of the camera main body 201. The flat display panel 202 such as a liquid crystal display is exposed on a rear surface of the camera main body 201. An opening 215 exposing the peep window 88b of the optical finder 87 attached to the lens barrel 71 is provided above the flat display panel 202 on the rear surface of the camera main body 201.

Further, a zoom button 216 for zooming, a mode switching dial 217, a selection button 218 and various operation buttons 219 are provided on a right side of the flat display panel 202 on the rear surface of the camera main body 201. The mode switching dial 217 is a dial operation part for selecting a function mode (such as a still mode or a video mode). The selection button 218 is a button for moving a menu selection cursor or the like and determining the selected menu. Examples of the various operation buttons 219 include: a reproduction button displaying an image recorded in a semiconductor recording medium in the flat display panel 202; a menu button displaying various menus; and a setting button setting a self-timer, a screen size and the like.

Figure 20:
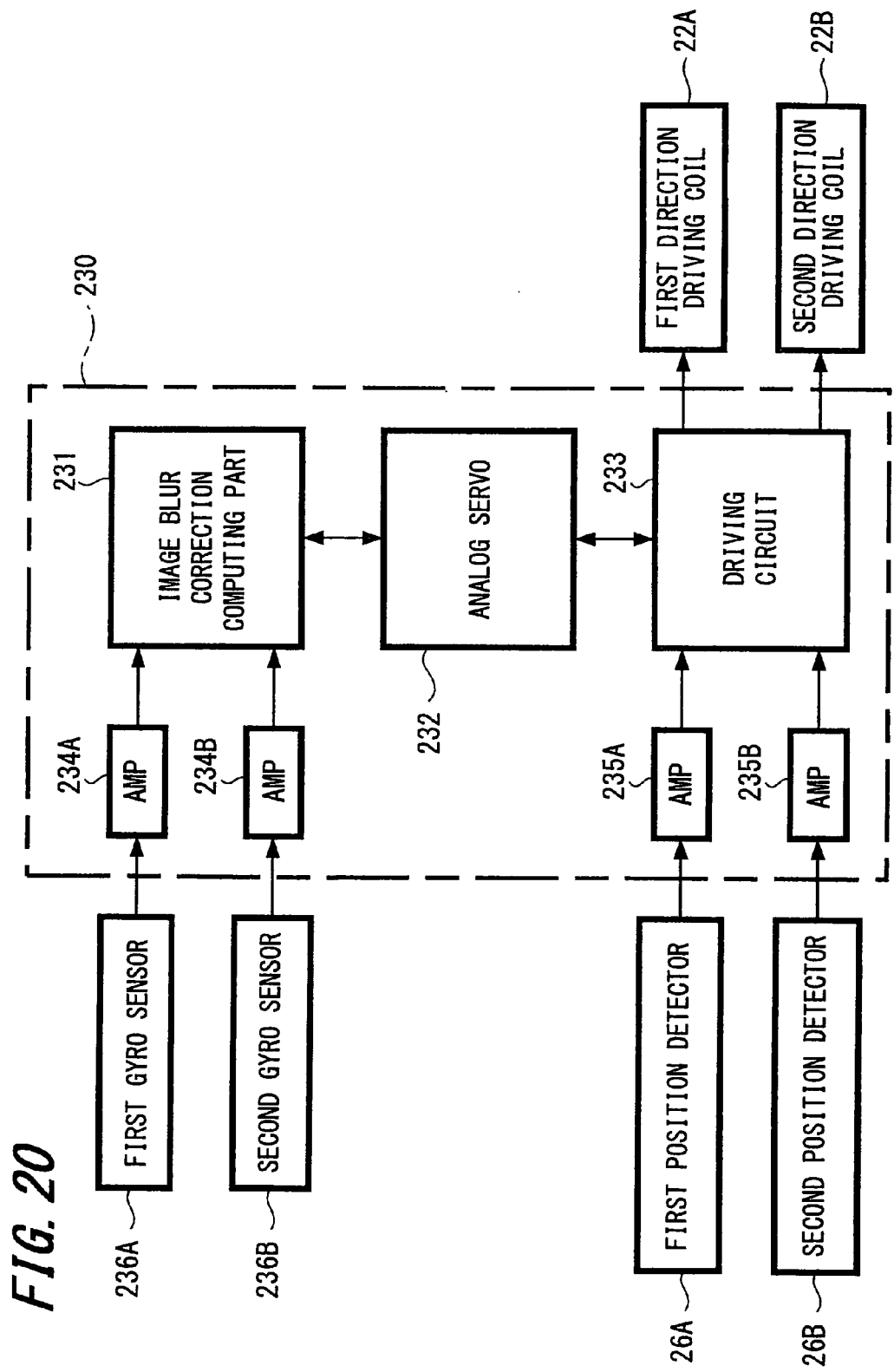
FIG. 20 is a block diagram for describing a control concept in an image blur correction device according to an embodiment of the present invention.

FIG. 20 is a block diagram for describing a control concept in the aforementioned image blur correction device 1. A control part 230 includes an image blur correction computing part 231, an analog servo 232, a driving circuit 233 and four amplifiers (AMP) 234A, 234B, 235A and 235B. A first gyro sensor 236A is connected to the image blur correction computing part 231 through the first amplifier (AMP) 234A. A second gyro sensor 236B is also connected to the image blur correction computing part 231 through the second amplifier (AMP) 234B.

The first gyro sensor 236A detects an amount of displacement in the first direction Y due to shake or the like applied to the camera main body 201. The second gyro sensor 236B detects an amount of displacement in the second direction X due to shake or the like applied to the camera main body 201. In this example, two gyro sensors are provided to detect an amount of displacement in the first direction Y and an amount of displacement in the second direction X individually; however, it is obviously possible to detect amounts of displacement in the first direction Y and the second directions X using one gyro sensor.

The analog servo 232 is connected to the image blur correction computing part 231. The analog servo 232 converts a digital value calculated by the image blur correction computing part 231 into an analog value and outputs a control signal corresponding to the analog value. The driving circuit 233 is connected to the analog servo 232. The first hole element 26A as a first position detector is connected to the driving circuit 233 through the third amplifier (AMP) 235A. The second hole element 26B as a second position detector is also connected to the driving circuit 233 through the fourth amplifier (AMP) 235B. Further, the first coil 22A of the first electric actuator 9A and the second coil 22B of the second electric actuator 9B are connected to the driving circuit 233, respectively.

An amount of displacement of the first movable frame 3 in the first direction Y detected by the first hole element 26A is input to the driving circuit 233 through the third amplifier 235A. An amount of displacement of the first and second movable frames 3 and 4 in the second direction X detected by the second hole element 26B is input to the driving circuit 233 through the fourth amplifier 235B. The driving circuit 233 outputs predetermined current to either or both of the first coil 22A and the second coil 22B to move the correction lens 2 for image blur correction, based on these input signals and a control signal from the analog servo 232.

Figure 21:
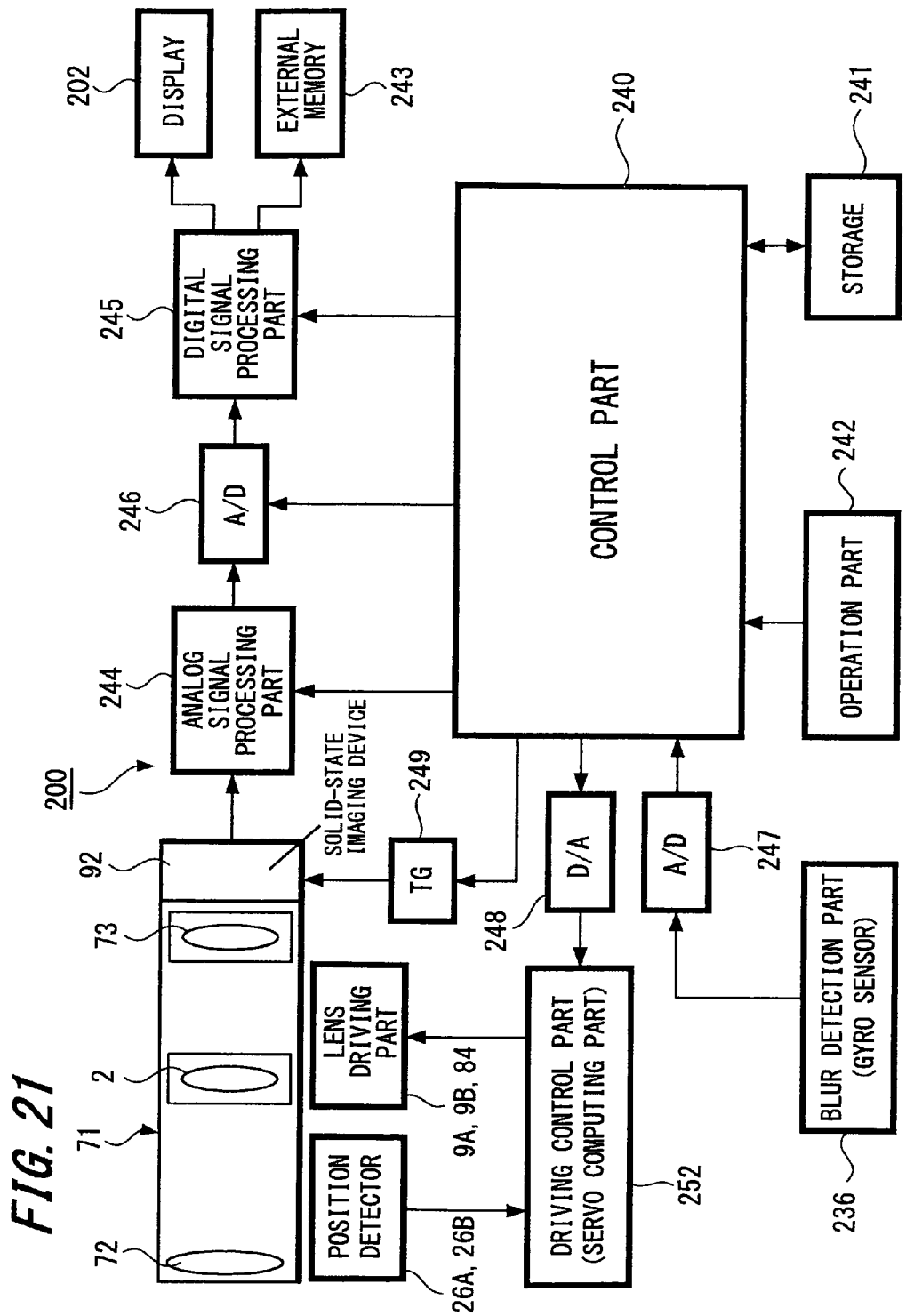
FIG. 21 is a block diagram showing a first example of a schematic configuration of an imaging apparatus according to an embodiment of the present invention.

FIG. 21 is a block diagram showing a first example of a schematic configuration of the digital still camera 200 including the image blur correction device 1 having the aforementioned configuration and action. The digital still camera 200 includes the lens barrel 71 having the image blur correction device 1; a control part 240 serving as a main part of the control device; a storage 241 having RAM and ROM such as a program memory and data memory to drive the control part 240; an operation part 242 outputting various command signals for turning the power supply on and off, selecting a photographing mode or photographing, for example; the flat display panel 202 displaying a photographed image; and an external memory 243 for a large storage capacity.

The control part 240 includes a computing circuit having a microcomputer (CPU), for example. The storage 241, the operation part 242, an analog signal processing part 244, a digital signal processing part 245, two A/D converters 246 and 247, a D/A converter 248 and a timing generator (TG) 249 are connected to the control part 240. The analog signal processing part 244 is connected to the solid-state imaging device 92 attached to the lens barrel 71. The analog signal processing part 244 performs predetermined signal processing using an analog signal corresponding to a photographed image output from the solid-state imaging device 92. The analog signal processing part 244 is connected to the first A/D converter 246. The first A/D converter 246 converts the analog signal into a digital signal.

The digital signal processing part 245 is connected to the first A/D converter 246. The digital signal processing part 245 performs predetermined signal processing based on the digital signal supplied from the first A/D converter 246. The flat display panel 202 and the external memory 243 are connected to the digital signal processing part 245. An object image is displayed in the flat display panel 202 or stored in the external memory 243 based on the digital signal output from the digital signal processing part 245. A gyro sensor 236 as a blur detection part is connected to the second A/D converter 247. The gyro sensor 236 detects vibration, shake or the like of the camera main body 201, and image blur correction is performed in response to the detection result.

A driving control part 252 as a servo computing part for image blur correction is connected to the D/A converter 248. The driving control part 252 drives and controls the zoom motor 84 in response to a command signal from the operation part 242, and drives and controls the first and second electric actuators 9A and 9B in response to a position of the correction lens 2. The first hole element 26A and the second hole element 26B as position detectors are connected to the driving control part 252. The first hole element 26A and the second hole element 26B detect a position of the first movable frame 3 of the image blur correction device 1 to detect a position of the correction lens 2. The timing generator (TG) 249 is connected to the solid-state imaging device 92.

Consequently, an image of the object is input to the lens system of the lens barrel 71 and formed on the image forming surface of the solid-state imaging device 92. Then, the image signal is output as an analog signal, subjected to predetermined processing at the analog signal processing part 244 and then converted into a digital signal at the first A/D converter 246. The output from the first A/D converter 246 is subjected to predetermined processing performed at the digital signal processing part 245 and then displayed in the flat display panel 202 as an image corresponding to the object or stored in the external memory 243 as stored information.

In such a photographing state, when the camera main body 201 receives vibration, shake, or the like while the image blur correction device 1 being operated, the gyro sensor 236 detects the vibration, shake, or the like and outputs its detection signal to the control part 240. The control part 240 performs predetermined arithmetic processing upon receiving the detection signal. The control part 240 outputs a control signal controlling movement of the image blur correction device 1 to the driving control part 252. The driving control part 252 outputs a predetermined driving signal to the image blur correction device 1 upon receiving the control signal from the control part 240. The image blur correction device 1 moves the first movable frame 3 in a predetermined amount in the first direction Y and moves the second movable frame 4 in a predetermined amount in the second direction X. Accordingly, an image blur is eliminated by moving the correction lens 2 and a clear image may be obtained.

Figure 22:
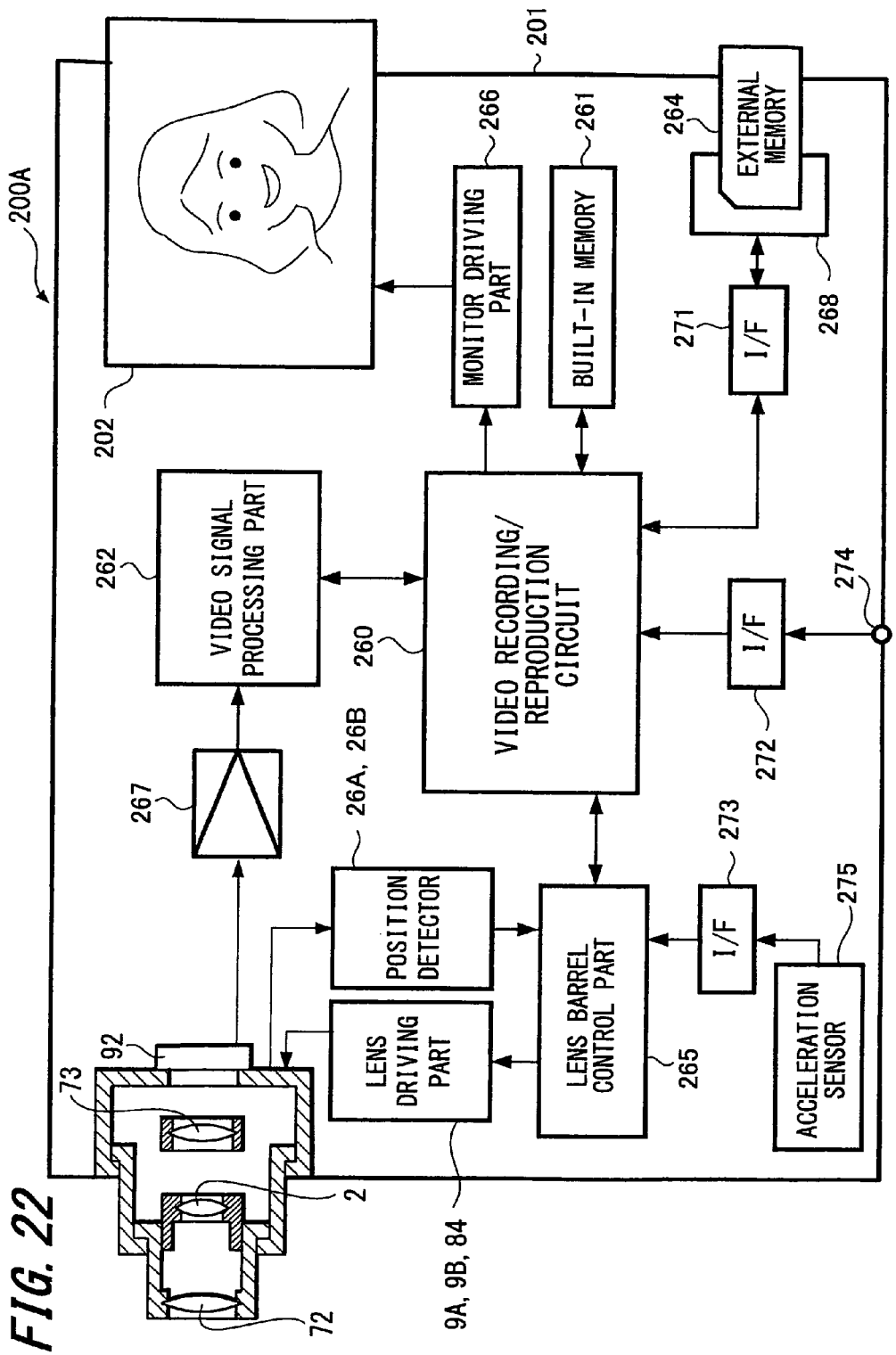
FIG. 22 is a block diagram showing a second example of a schematic configuration of an imaging apparatus according to an embodiment of the present invention.

FIG. 22 is a block diagram showing a second example of a schematic configuration of the digital still camera including the image blur correction device 1 having the aforementioned configuration and action. The digital still camera 200A includes: the lens barrel 71 having the image blur correction device 1. Further, the digital still camera 200A includes a video recording/reproduction circuit 260 serving as a main part of the control device; a built-in memory 261 having RAM and ROM such as a program memory and data memory to drive the video recording/reproduction circuit 260; a video signal processing part 262 processing a photographed video or the like into a predetermined signal; the flat display panel 202 displaying the photographed video or the like; an external memory 264 for a large storage capacity; and a lens barrel control part 265 driving and controlling the image blur correction device 1.

The video recording/reproduction circuit 260 includes a computing circuit having a microcomputer (CPU), for example. The built-in memory 261, the video signal processing part 262, the lens barrel control part 265, a monitor driving part 266, an amplifier 267 and three interfaces (I/F) 271, 272 and 273 are connected to the video recording/reproduction circuit 260. The video signal processing part 262 is connected to the solid-state imaging device 92 attached to the lens barrel 71 through the amplifier 267. A signal processed into a predetermined video signal is input to the video recording/reproduction circuit 260.

The flat display panel 202 is connected to the video recording/reproduction circuit 260 through the monitor driving part 266. A connector 268 is connected to the first interface (I/F) 271. The external memory 264 is detachably connected to the connector 268. A connection terminal 274 provided in the camera main body 201 is connected to the second interface (I/F) 272.

An acceleration sensor 275 as a blur detection part is connected to the lens barrel control part 265 through the third interface (I/F) 273. The acceleration sensor 275 detects displacement due to vibration, shake, or the like applied to the camera main body 201 as an acceleration. A gyro sensor may be used as the acceleration sensor 275. The zoom motor 84 showing a first specific example of a lens driving part and the first and second electric actuators 9A and 9B showing a second specific example of a lens driving part are connected to the lens barrel control part 265. The two hole elements 26A and 26B as position detectors detecting a position of the correction lens 2 are also connected to the lens barrel control part 265.

Consequently, an image of the object is formed on the image forming surface of the solid-state imaging device 92 with image-light input to the lens system of the lens barrel 70. Then, the image signal is input to the video signal processing part 262 through the amplifier 267. The signal processed into a predetermined video signal at the video signal processing part 262 is input to the video recording/reproduction circuit 260. Accordingly, a signal corresponding to the image of the object is output to the monitor driving part 266, the built-in memory 261 or the external memory 264 from the video recording/reproduction circuit 260. As a result, an image corresponding to the object is displayed in the flat display panel 202 through the monitor driving part 266 or recorded in the built-in memory 261 or the external memory 264 as an information signal as necessary.

In such a photographing state, when the camera main body 201 receives vibration, shake, or the like while the image blur correction device 1 being operated, the acceleration sensor 275 detects the vibration, shake, or the like. Then, the detection signal is output to the video recording/reproduction circuit 260 through the lens barrel control part 265. The video recording/reproduction circuit 260 performs predetermined arithmetic processing upon receiving the signal. The video recording/reproduction circuit 260 outputs a control signal controlling movement of the image blur correction device 1 to the lens barrel control part 265. The lens barrel control part 265 outputs a predetermined driving signal to the image blur correction device 1 upon receiving the control signal from the video recording/reproduction circuit 260. The image blur correction device 1 moves the first movable frame 3 in a predetermined amount in the first direction Y and moves the second movable frame 4 in a predetermined amount in the second direction X. Accordingly, an image blur is eliminated by movement of the correction lens 2 and a clear image may be obtained.

As described above, according to an image blur correction device, a lens barrel and an imaging apparatus according to an embodiment of the present invention, a first auxiliary guide shaft shorter than a first main guide shaft is placed on an outer periphery of a fixed frame, and a second driving part is placed between the first auxiliary guide shaft and a correction lens. A second auxiliary guide shaft shorter than a second main guide shaft is placed on the outer periphery of the fixed frame, and a first driving part is placed between the second auxiliary guide shaft and the correction lens. Accordingly, a space opposite to the first main guide shaft across the correction lens and a space opposite to the second main guide shaft across the correction lens can be used efficiently. As a result, the device may be reduced in size in an optical axis direction of the correction lens and in a direction perpendicular to the optical axis direction to reduce the whole device in size.

The first main guide shaft, the second auxiliary guide shaft and the first driving part are placed symmetrically to the second main guide shaft, the first auxiliary guide shaft and the second driving part with respect to a line connecting a pair of rectilinear guide grooves provided to the fixed frame. Therefore, a space for forming rectilinear guide grooves may be ensured without increasing the fixed frame in diameter, and the whole device may be reduced in size.

The present invention is not limited to the embodiments described above and shown in the drawings, and various modifications may be effected without departing from the gist of the present invention. For example, the present invention is applied to a digital still camera as an imaging apparatus in the aforementioned embodiments; however, the present invention may also be applied to other imaging apparatuses such as a digital video camera, a personal computer with a camera, and a mobile phone unit with a camera. In the aforementioned embodiments, a lens barrel includes three lens groups; however, a lens barrel according to an embodiment of the present invention may obviously include two or less lens groups or four or more lens groups.

It should be understood by those skilled in the art that various modifications, combinations, sub-combinations and alterations may occur depending on design requirements and other factors insofar as they are within the scope of the appended claims or the equivalents thereof.

What is claimed is:

1. An image blur correction device comprising:
a correction lens configured to correct an image blur in a lens system;
a first movable frame holding the correction lens;
a second movable frame supporting the first movable frame to be movable in a first direction perpendicular to an optical axis of the lens system;
a fixed frame supporting the second movable frame to be movable in a second direction perpendicular to the optical axis of the lens system and perpendicular to the first direction;
a first main guide shaft and a first auxiliary guide shaft arranged opposite across the correction lens, guiding the first movable frame in the first direction;
a second main guide shaft and a second auxiliary guide shaft arranged opposite across the correction lens, guiding the second movable frame in the second direction;
a first driving part moving the first movable frame in the first direction; and
a second driving part moving the second movable frame in the second direction,
wherein the first auxiliary guide shaft is shorter than the first main guide shaft and the second driving part is placed between the first auxiliary guide shaft and the correction lens,
wherein the second auxiliary guide shaft is shorter than the second main guide shaft and the first driving part is placed between the second auxiliary guide shaft and the correction lens,
wherein the correction lens is a lens movable in an optical axis direction of the lens system through the fixed frame, and
wherein the fixed frame has a pair of guide grooves extending in a direction parallel to an optical axis direction of the correction lens in positions rotationally displaced at about 180° to each other around the correction lens.

2. An image blur correction device according to claim 1, wherein the first driving part and the second driving part are electric actuators each having a magnet and a coil, and
wherein the magnet is fixed to one of the first movable frame and the fixed frame and the coil is fixed to the other of the first movable frame and the fixed frame.

3. An image blur correction device according to claim 2, wherein each of the magnets of the first driving part and the second driving part is fixed to the first movable frame, and each of the coils of the first driving part and the second driving part is fixed to the fixed frame.

4. An image blur correction device according to claim 2, wherein the coil is a flat coil planarly wound, and
wherein the coil of the first driving part has a thrust generation part in which current flows in a direction perpendicular to the first direction, and the coil of the second driving part has a thrust generation part in which current flows in a direction perpendicular to the second direction.

5. A lens barrel having a collapsible cylinder extended during photographing, the lens barrel comprising:
- a lens system stored in the cylinder; and
- an image blur correction device arranged in the cylinder, having a correction lens configured to correct an image blur in the lens system,
- the image blur correction device including:
- a first movable frame holding the correction lens;
- a second movable frame supporting the first movable frame to be movable in a first direction perpendicular to an optical axis of the lens system;
- a fixed frame supporting the second movable frame to be movable in a second direction perpendicular to the optical axis of the lens system and perpendicular to the first direction;
- a first main guide shaft and a first auxiliary guide shaft arranged opposite across the correction lens, guiding the first movable frame in the first direction;
- a second main guide shaft and a second auxiliary guide shaft arranged opposite across the correction lens, guiding the second movable frame in the second direction;
- a first driving part moving the first movable frame in the first direction; and
- a second driving part moving the second movable frame in the second direction,
- wherein the first auxiliary guide shaft is shorter than the first main guide shaft and the second driving part is placed between the first auxiliary guide shaft and the correction lens,
- wherein the second auxiliary guide shaft is shorter than the second main guide shaft and the first driving part is placed between the second auxiliary guide shaft and the correction lens,
- wherein the correction lens in the image blur correction device is a lens movable in an optical axis direction of the lens system through the fixed frame,
- wherein the fixed frame has a pair of guide grooves extending in a direction parallel to an optical axis direction of the correction lens in positions rotationally displaced at about 180° to each other around the correction lens, and
- wherein a pair of guide pieces are provided in the cylinder to be slidably engaged with the pair of guide grooves, respectively.

6. A lens barrel according to claim 5,
- wherein the cylinder has a rotating member having an inner periphery provided with a cam groove, rotatable relative to the fixed frame of the image blur correction device and relatively movable in the optical axis direction of the lens system, and
- wherein the fixed frame has a cam follower engaged with the cam groove of the rotating member, allowing the rotating member to rotate while being moved in the optical axis direction so that the fixed frame moves in the optical axis direction.

7. A lens barrel according to claim 5,
- wherein the correction lens is moved in the optical axis direction of the lens system to perform zooming of the lens system.

8. An imaging apparatus comprising:
- a lens barrel including a collapsible cylinder in which a lens system is stored and which is extended during photographing, and an image blur correction device arranged in the cylinder and having a correction lens configured to correct an image blur in the lens system; and
- a device main body to which the lens barrel is attached,
- the image blur correction device including
- a first movable frame holding the correction lens,
- a second movable frame supporting the first movable frame to be movable in a first direction perpendicular to an optical axis of the lens system,
- a fixed frame supporting the second movable frame to be movable in a second direction perpendicular to the optical axis of the lens system and perpendicular to the first direction,
- a first main guide shaft and a first auxiliary guide shaft arranged opposite across the correction lens, guiding the first movable frame in the first direction,
- a second main guide shaft and a second auxiliary guide shaft arranged opposite across the correction lens, guiding the second movable frame in the second direction,
- a first driving part moving the first movable frame in the first direction, and
- a second driving part moving the second movable frame in the second direction,
- wherein the first auxiliary guide shaft is shorter than the first main guide shaft and the second driving part is placed between the first auxiliary guide shaft and the correction lens,
- wherein the second auxiliary guide shaft is shorter than the second main guide shaft and the first driving part is placed between the second auxiliary guide shaft and the correction lens,
- wherein the correction lens is a lens movable in an optical axis direction of the lens system through the fixed frame, and
- wherein the fixed frame has a pair of guide grooves extending in a direction parallel to an optical axis direction of the correction lens in positions rotationally displaced at about 180° to each other around the correction lens.

* * * * *